US010935867B2

(12) United States Patent
Noh et al.

(10) Patent No.: US 10,935,867 B2
(45) Date of Patent: Mar. 2, 2021

(54) BOTTOM MEMBER AND DISPLAY DEVICE INCLUDING THE SAME

(71) Applicant: Samsung Display Co., Ltd., Yongin-si (KR)

(72) Inventors: Jung Hun Noh, Yongin-si (KR); Yi Joon Ahn, Seoul (KR); Myung Im Kim, Yongin-si (KR); Han Na Ma, Suwon-si (KR); Jae Woo Im, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 173 days.

(21) Appl. No.: 16/158,822

(22) Filed: Oct. 12, 2018

(65) Prior Publication Data
US 2019/0196298 A1 Jun. 27, 2019

(30) Foreign Application Priority Data
Dec. 21, 2017 (KR) .......................... 10-2017-0176859

(51) Int. Cl.
G02F 1/33 (2006.01)
G06F 1/20 (2006.01)
G06F 1/16 (2006.01)
G02B 5/00 (2006.01)

(52) U.S. Cl.
CPC .............. G02F 1/33 (2013.01); G02B 5/003 (2013.01); G06F 1/1637 (2013.01); G06F 1/1688 (2013.01); G06F 1/20 (2013.01)

(58) Field of Classification Search
CPC ...... G02F 1/33; G06F 1/16; G06F 1/20; G02B 5/00; H04R 1/028; H04R 2400/03; H04R 2440/05; H04R 2440/07; H04R 2499/15
USPC ................................................ 381/158, 822
See application file for complete search history.

(56) References Cited

U.S. PATENT DOCUMENTS

| 8,040,455 | B2 | 10/2011 | Won et al. |
| 8,947,616 | B2 | 2/2015 | Tang et al. |
| 9,420,363 | B2 | 8/2016 | Seo et al. |
| 10,330,918 | B1* | 6/2019 | Sakai ...................... G02B 5/003 |
| 2014/0241564 | A1* | 8/2014 | Kang ................... H04B 1/3888 381/386 |
| 2015/0078604 | A1* | 3/2015 | Seo ........................ G06F 1/1635 381/333 |
| 2018/0365926 | A9* | 12/2018 | Pececnik ............... G07F 17/322 |

FOREIGN PATENT DOCUMENTS

JP 2010085453 4/2010

* cited by examiner

Primary Examiner — Melur Ramakrishnaiah
(74) Attorney, Agent, or Firm — Cantor Colburn LLP

(57) ABSTRACT

A bottom member includes a light-absorbing element; a top coupling layer disposed on the light-absorbing element; a first buffer element disposed under the light-absorbing element, where a first opening is defined in the first buffer element; a filling layer disposed in the first opening; and a vibrating acoustic element disposed below the first buffer element, where the vibrating acoustic element overlaps with the first opening and the light-absorbing element when viewed from a top, and the vibrating acoustic element is coupled with the first buffer element via the filling layer.

29 Claims, 22 Drawing Sheets

BOTTOM MEMBER AND DISPLAY DEVICE INCLUDING THE SAME

This application claims priority to Korean Patent Application No. 10-2017-0176859, filed on Dec. 21, 2017, and all the benefits accruing therefrom under 35 U.S.C. 119, the content of which in its entirety is herein incorporated by reference.

BACKGROUND

1. Field

The disclosure relates to a bottom member disposed under a display panel, and a display device including the bottom member.

2. Description of the Related Art

Electronic devices that provide images to a user such as a smart phone, a digital camera, a laptop computer, a navigation device and a smart television ("TV") typically include a display device for displaying images. A display device typically includes a display panel for generating and displaying images, and a bottom member disposed under the display panel. The bottom member may include various functional sheets for protecting the display panel from heat, external impact, and the like.

An electronic device including such a display device capable of displaying images may further include a separate speaker to provide sound.

SUMMARY

Aspects of the disclosure provide a bottom member with a vibrating acoustic element.

Aspects of the disclosure also provide a display device with a vibrating acoustic element.

According to an exemplary embodiment of the disclosure, there are provided a display device having a sound-generating feature, and a bottom member for such a display device.

Further, according to exemplary embodiments of the disclosure, the impact resistance of a display device having a sound-generating feature, and a bottom member for such a display device can be improved.

An embodiment of a bottom member includes a light-absorbing element; a top coupling layer disposed on the light-absorbing element; a first buffer element disposed under the light-absorbing element, where a first opening is defined in the first buffer layer; a filling layer disposed in the first opening; and a vibrating acoustic element disposed below the first buffer element, where the vibrating acoustic element overlaps with the first opening and the light-absorbing element when viewed from a top, and the vibrating acoustic element is coupled with the first buffer element via the filling layer.

An embodiment of a display device includes a display panel, and a bottom member disposed under the display panel. In such an embodiment, the bottom member includes: a light-absorbing element disposed under the display panel; a top coupling layer disposed between the light-absorbing element and the display panel to couple the light-absorbing element with the display panel; a first buffer element disposed under the light-absorbing element, where a first opening is defined in the first buffer layer; a filling layer disposed in the first opening; and a vibrating acoustic element disposed below the first buffer element, wherein the vibrating acoustic element overlaps with the first opening and the light-absorbing element when viewed from a top, and the vibrating acoustic element is coupled with the first buffer element via the filling layer.

An embodiment of a display device includes a display panel; a light-absorbing element disposed under and coupled with the display panel; a buffer element disposed under and coupled with the light-absorbing element, where a first opening is defined in the buffer element; and a vibrating acoustic element disposed under and coupled with the buffer element, where a periphery of the first opening is located more inside than a periphery of the vibrating acoustic element when viewed from a top.

BRIEF DESCRIPTION OF THE DRAWINGS

The above and other features of the disclosure will become more apparent by describing in detail exemplary embodiments thereof with reference to the attached drawings, in which.

DETAILED DESCRIPTION OF THE EMBODIMENTS

Figure 1:
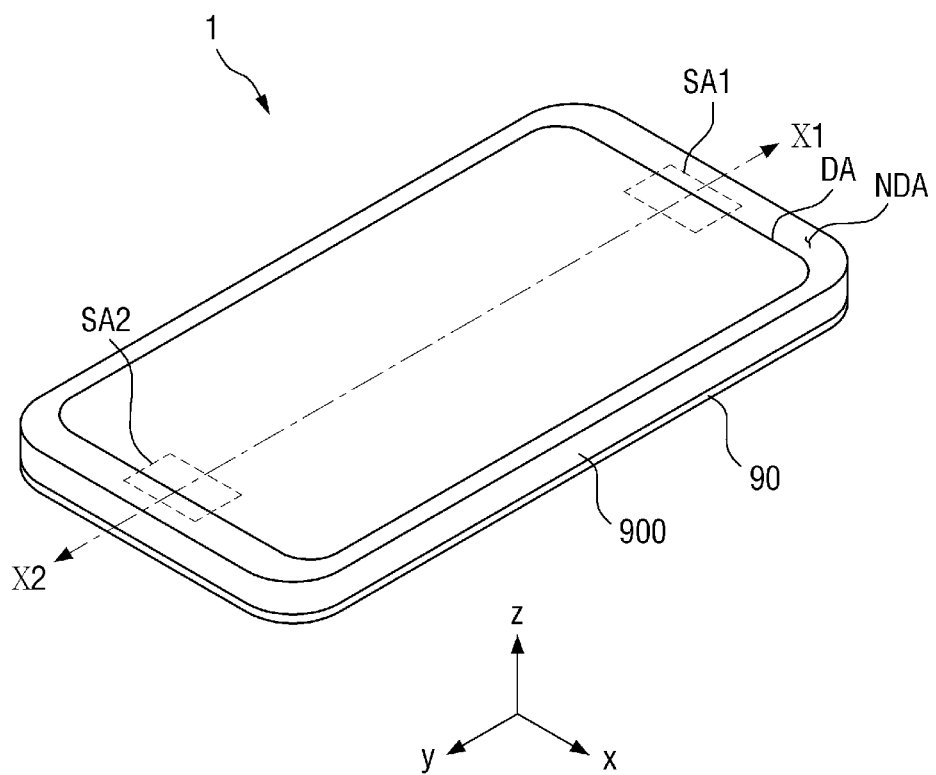
FIG. 1 is a perspective view of a display device according to an exemplary embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

When a first element is referred to as being "on", "connected to" or "coupled to" a second element or layer, the first element can be directly on, connected or coupled to the second element, or one or more intervening elements may be present between the first element and the second element. In contrast, when a first element is referred to as being "directly on", "directly connected to" or "directly coupled to" a second element or layer, there are no intended intervening elements (except environmental elements such as air) present between the first element and the second element. The term "and/or" may include any and all combinations of one or more of the associated items.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the disclosure will be described with reference to the accompanying drawings.

Figure 2:
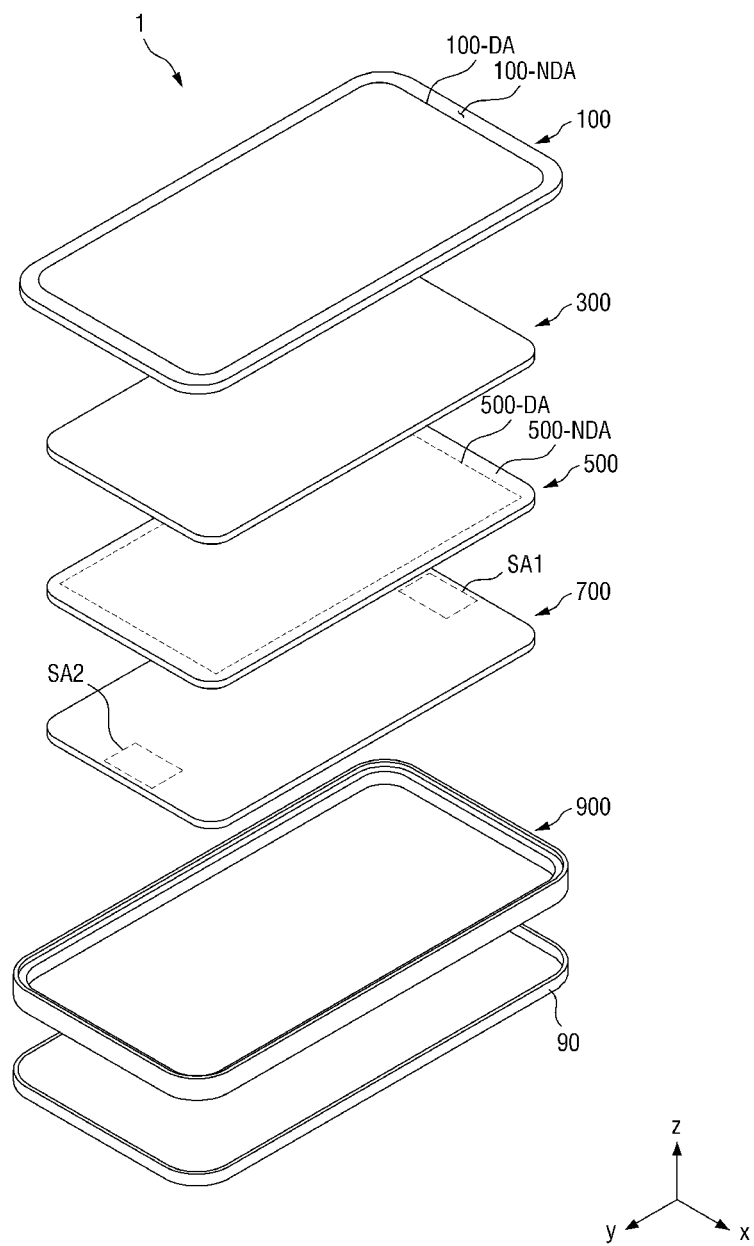
FIG. 2 is an exploded perspective view of the display device shown in FIG. 1.
Figure 3:
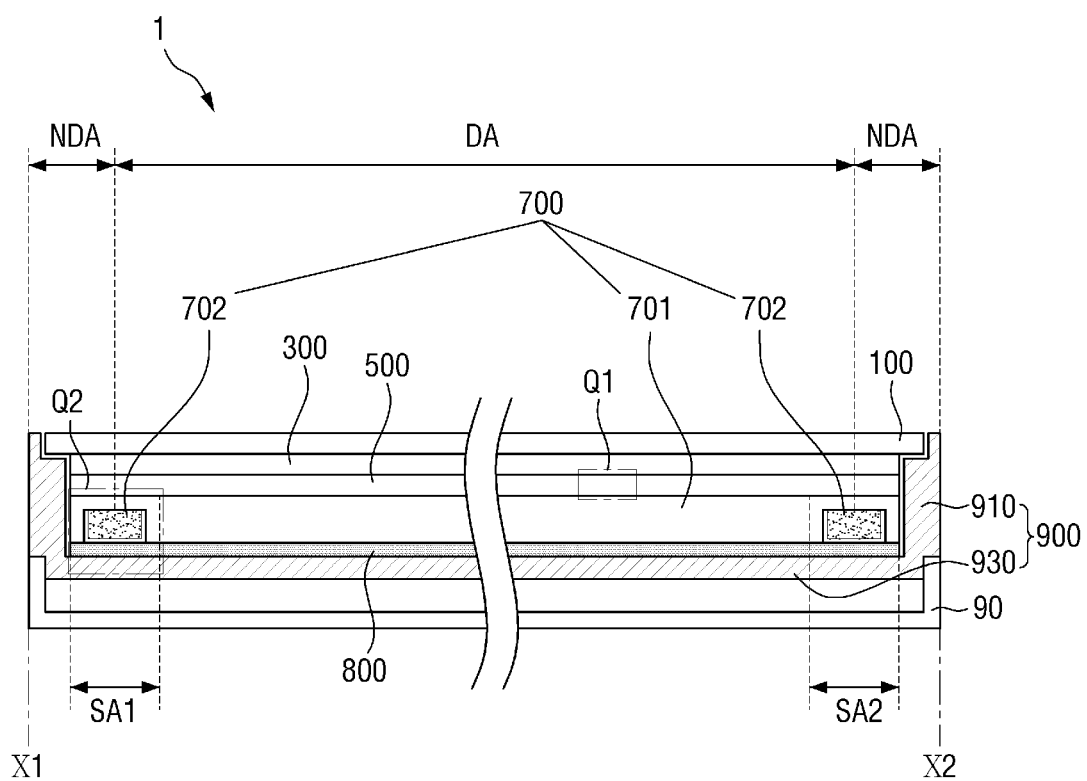
FIG. 3 is a cross-sectional view taken along line X1-X2 of FIG. 1.

FIG. 1 is a perspective view of a display device according to an exemplary embodiment of the disclosure. FIG. 2 is an exploded perspective view of the display device shown in FIG. 1. FIG. 3 is a cross-sectional view taken along line X1-X2 of FIG. 1.

FIG. 1 shows a portable terminal including an exemplary embodiment of a display device 1. The portable terminal may include a tablet personal computer ("PC"), a smart phone, a personal digital assistant ("PDA"), a portable multimedia player ("PMP"), a game device, a wristwatch type electronic device, and the like. It is, however, to be understood that the type of the display device 1 is not limited to those listed above. In an alternative exemplary embodiment, the display device 1 may be used in a large electronic device such as a television and an electric board, a small and medium electronic device such as a desktop PC, a laptop computer, a vehicle navigation device and a camera.

Referring to FIG. 1, an exemplary embodiment of the display device 1 may have a rectangular-like shape (e.g., a rectangle with rounded corners) when viewed from a top (e.g., from a top plan view or a plan view in a thickness direction of the display device 1). The display device 1 may have two shorter sides extending in a direction (e.g., an x-axis direction), and two longer sides extending in another direction (e.g., a y-axis direction). In an alternative exemplary embodiment, the corners where the longer sides and the shorter sides of the display device 1 meet may form a right angle. The shape of the display device 1 when viewed from the top is not limited to that shown in the drawings. Alternatively, the display device 1 may have a circular shape or other shapes.

The display device 1 includes a display area DA for displaying an image, and a non-display area NDA adjacent to the display area DA. In some exemplary embodiments, the non-display area NDA may surround the display area DA.

The display device 1 may include side areas SA1 and SA2 in each of which a vibrating acoustic element to be described later is disposed. A vibrating acoustic element is defined as a device that implements speaker functionality or microphone functionality using vibration. In some exemplary embodiments, the side areas SA1 and SA2 may include a first side area SA1 disposed on a side of the display area DA, and a second area SA2 disposed on an opposing side of the display area DA.

In some exemplary embodiments, a part of the side areas SA1 and SA2 may be a part of the display area DA. In one exemplary embodiment, for example, as shown in FIG. 1, a part of the first side area SA1 may be a part of the display area DA, and the remaining part of the first side area SA1 may be a part of the non-display area NDA. In such an embodiment, a part of the second side area SA2 may be a part of the display area DA, and the remaining part of the second side area SA2 may be a part of the non-display area NDA. It is, however, to be understood that this is merely illustrative or exemplary. In one exemplary embodiment, for example, in alternative exemplary embodiments, an entire part of each of the first side area SA1 and the second side area SA2 may be defined by a part of the display area DA. Alternatively, in other alternative exemplary embodiments, a part or all of one of the first side area SA1 and the second side area SA2 may be defined by a part of the display area DA, and a part or all of the other of the first side area SA1 and the second side area SA2 be defined by the non-display area NDA.

In some exemplary embodiments, the side areas SA1 and SA2 may be disposed on a line that equally divides the shorter sides of the display device 1 along a direction parallel to the longer sides of the display device 1.

Although FIG. 1 shows that an exemplary embodiment where the side areas SA1 and SA2 are divided into the first side area SA1 and the second side area SA2 such that the first side area SA1 and the second side area SA2 are located on the opposite sides with the display area DA therebetween, this is merely illustrative or exemplary. The arrangement and number of the side areas SA1 and SA2 may be variously modified depending on implementations.

Referring to FIGS. 2 and 3, an exemplary embodiment of the display device 1 includes a display panel 500 and a bottom member 700 disposed under the display panel 500. The display device 1 may further include an input sensing element (e.g., a touch panel) 300 and a window 100 disposed on the display panel 500. In such an embodiment, the display device 1 may further include a bracket 900 disposed under the bottom member 700.

As used herein, "above," "top" and "upper surface" refer to the side of the display panel 500 in a z-axis direction where images are displayed, whereas "below," "bottom" and "lower surface" refer to the opposite side of the display panel 500 in the z-axis direction, unless stated otherwise.

The window 100 includes a light-transmitting portion 100-DA for transmitting an image provided by the display panel 500, and a light-blocking portion 100-NDA adjacent to the light-transmitting portion 100-DA. In some exemplary embodiments, an opaque masking layer may be disposed on an inner surface of the light-blocking portion 100-NDA of the window 100.

The window 100 may be disposed on the upper surface of the display panel 500 to protect the display panel 500. The window 100 may be disposed to overlap the display panel 500 and cover the entire surface of the display panel 500. The window 100 may be larger than the display panel 500. In one exemplary embodiment, for example, the window 100 may protrude outwardly or extend further from the shorter sides of the display panel 500. The window 100 may protrude from the display panel 500 also at the longer sides of the display device 1. The window 100 may protrude more at the shorter sides than at the longer sides.

The window 100 may include or be made of glass, sapphire, plastic, or the like. In an exemplary embodiment, the window 100 may be rigid or flexible.

In an exemplary embodiment, the input sensing element 300 may be disposed between the display panel 500 and the window 100. The input sensing element 300 may acquire position information of a touch point by self-capacitance sensing and/or mutual-capacitance sensing. The input sensing element 300 may be a rigid panel, a flexible panel, or a film.

The input sensing element 300 may have substantially the same size as the display panel 500 and may overlap the display panel 500. The sides of the input sensing element may be aligned with the sides of the display panel 500, for example. The display panel 500 and the input sensing element 300, and the input sensing element 300 and the window 100 may be coupled with each other by a transparent coupling layer such as an optical clear adhesive ("OCA") and an optical clear resin ("OCR"). In an alternative embodiment, the input sensing element 300 may be omitted. In such an embodiment, where the input sensing element is omitted, the display panel 500 may be coupled with the window 100 by an OCA, an OCR, or the like.

Alternatively, in some embodiments of the disclosure, the input sensing element 300 may be integrated with the display panel 500. In one exemplary embodiment, for example, a touch electrode of the input sensing element 300 may be disposed directly on the display panel 500 or the touch electrode of the input sensing element 300 may be disposed inside the display panel 500.

The display panel 500 includes a display area 500-DA and a non-display area 500-NDA. The display area 500-DA displays images and overlaps with the light-transmitting portion 100-DA of the window 100. The non-display area 500-NDA does not display images, is adjacent to the display area 500-DA, and overlaps with the light-blocking portion 100-NDA of the window 100.

In some exemplary embodiments, the display panel 500 may include a self-luminous element. In an exemplary embodiment, the self-luminous element may include at least one of an organic light-emitting diode, a quantum dot light-emitting diode, a micro light-emitting diode based on inorganic material (e.g., Micro LED) and a nano light-emitting diode based on inorganic material (e.g., Nano LED). Hereinafter, for convenience of description, exemplary embodiments where the self-luminous element is an organic light-emitting element will be described in detail.

Each of the elements of the display panel 500 will be described later in greater detail with reference to FIG. 4.

The bottom member 700 is disposed under the display panel 500. The bottom member 700 may be coupled with the display panel 500. The bottom member 700 may have substantially the same size as the display panel 500 and may overlap the display panel 500. The sides of the bottom member 700 may be aligned with the sides of the display panel 500, for example. The bottom member 700 may perform heat dissipation function, electromagnetic-wave-blocking function, light-blocking or light-absorbing function, buffering function, etc. The bottom member 700 may include a functional layer having at least one of the above-described functions. The functional layer may be provided in a form of a layer, a film, a sheet, a plate or a panel, for example, but not being limited thereto.

The bottom member 700 may include a functional layer portion 701 and vibrating acoustic elements 702 coupled at a lower part of the functional layer portion 701.

The functional layer portion 701 includes one or more of the above-described functional layers. When the functional layer portion 701 includes a plurality of functional layers, the functional layers may be disposed to overlap with one another. One of the functional layers may be stacked on another of the functional layers directly or via a coupling layer.

The thickness of the part of the functional layer portion 701 in the side areas SA1 and SA2 may be smaller than the thickness of the other parts.

The vibrating acoustic element 702 vibrates in response to a sound signal. The sound signal may be an electrical signal corresponding to acoustic data provided by an external circuit or the like. The vibrating acoustic element 702 may be implemented as a piezoelectric element including a layer of vibrating material. The layer of vibrating material may be mechanically deformed in response to the sound signal, and the vibrating acoustic element 702 may vibrate due to the mechanical deformation. In one exemplary embodiment, for example, the layer of vibrating material may include at least one of a piezoelectric film such as a polyvinylidene fluoride ("PVDF") film, a piezoelectric material such as lead zirconate titanate ("PZT") ceramics, and an electroactive polymer.

The vibrating acoustic element 702 may be coupled at the lower part of the functional layer portion 701 and may be located in the side areas SA1 and SA2. In an exemplary embodiment where the display device 1 includes the first side area SA1 and the second side area SA2 as the side areas SA1 and SA2, the vibrating acoustic element 702 may be disposed each of the first side area SA1 and the second side area SA2.

At least a part of the vibrating acoustic element 702 may be located in (e.g., disposed to overlap) the display area DA when viewed from the top. In one exemplary embodiment, for example, as shown in FIG. 3, a part of the vibrating acoustic element 702 in the first side area SA1 may be located in the display area DA, and a part of the vibrating acoustic element 702 in the second side area SA2 may be located in the display area DA. It is, however, to be understood that this is merely illustrative or exemplary. In some exemplary embodiments, both of the vibrating acoustic elements 702 located in the first side area SA1 and the second side area SA2 may be located in the display area DA. In alternative exemplary embodiments, the vibrating acoustic element 702 in the first side area SA1 may be partially located in the display area DA, and the vibrating acoustic element 702 in the second side area SA2 may be entirely located in the non-display area NDA.

Alternative exemplary embodiments of the bottom member 700 will be described later.

The bracket 900 may be disposed under the bottom member 700. The bracket 900 supports the window 100, the input sensing element 300, the display panel 500, and the bottom member 700. The bracket 900 may include a bottom surface 930 and side walls 910. The bottom surface 930 of the bracket 900 may face the lower surface of the bottom member 700, and the side walls 910 of the bracket 900 may face the side surfaces of each of the window 100, the input sensing element 300, the display panel 500 and the bottom member 700. The bracket 900 may include or be made of a synthetic resin material, a metal material, or a combination of different materials.

In some exemplary embodiments, a part of the bracket 900 may be exposed from the side surfaces of the display device 1 to form the side exterior of the display device 1.

In some exemplary embodiments, a bottom case 90 may be disposed under the bracket 900. The bottom case 90 may accommodate elements disposed thereon and may form the rear exterior of the display device 1. In some exemplary embodiments, a space may be defined or provided between the bottom case 90 and the bracket 900 in which electronic components such as a main circuit board, a battery, and the like are accommodated. The bottom case 90 may include a plastic or a metal.

Figure 4:
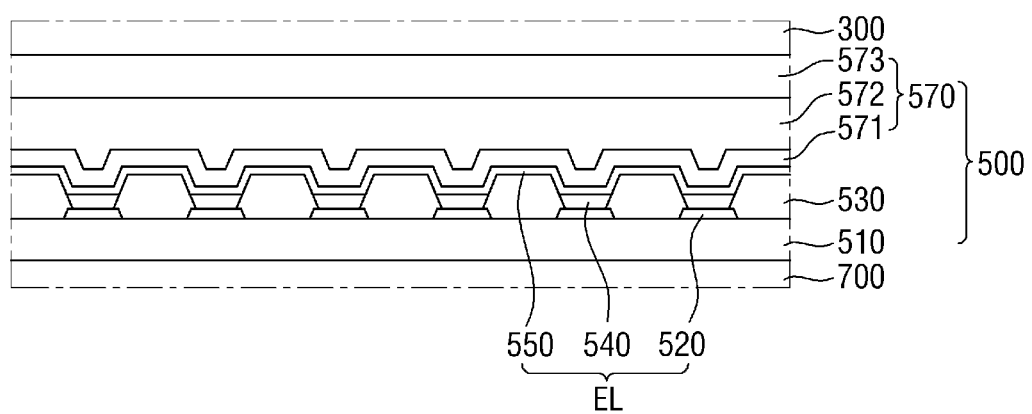
FIG. 4 is an enlarged cross-sectional view of the portion Q1 of FIG. 3, and more specifically, an enlarged cross-sectional view of the display panel of FIG. 3.

FIG. 4 is an enlarged cross-sectional view of the portion Q1 of FIG. 3, and more specifically, an enlarged cross-sectional view of the display panel of FIG. 3.

Referring to FIG. 4, an exemplary embodiment of the display panel 500 may include a base substrate 510, a first electrode 520, a pixel-defining layer 530, an emission layer 540, a second electrode 550, and an encapsulation layer 570.

The base substrate 510 may be disposed on the bottom member 700. The base substrate 510 may be an insulating substrate. In an exemplary embodiment, the base substrate 510 may include a flexible polymer material. The polymer material may include polyethersulphone ("PES"), polyacrylate ("PA"), polyacrylate ("PAR"), polyetherimide ("PEI"), polyethylenenapthalate ("PEN"), polyethyleneterepthalate ("PET"), polyphenylenesulfide ("PPS"), polyallylate, polyimide ("PI"), polycarbonate ("PC"), cellulosetriacetate ("CAT"), cellulose acetate propionate ("CAP"), or combinations thereof.

The first electrode 520 may be disposed on the base substrate 510. In some exemplary embodiments, the first electrode 520 may be an anode electrode.

Although not shown in the drawings for convenience of illustration, a plurality of elements may be further disposed between the base substrate 510 and the first electrode 520. In one exemplary embodiment, for example, the elements may include a buffer layer, a plurality of conductive wirings, an insulating layer, a plurality of thin-film transistors, etc.

The pixel-defining layer 530 may be disposed on the first electrode 520. The pixel-defining layer 530 may define an opening that exposes at least a part of the first electrode 520.

The emission layer 540 may be disposed on the first electrode 520.

In some exemplary embodiments, the emission layer 540 may emit one of red light, green light, and blue light. The wavelength of the red light may be in a range approximately from 620 nanometers (nm) to 750 nm, and the wavelength of the green light may be in a range approximately from 495 nm to 570 nm. Further, the wavelength of the blue light may be in a range approximately from 450 nm to 495 nm.

In an alternative exemplary embodiment of the disclosure, the emission layer 540 may emit white light. In such an embodiment where the emission layer 540 emits white light, the emission layer 540 may have a stack structure of a red emission layer, a green emission layer and a blue emission layer. In such an embodiment, additional color filters for displaying red, green and blue colors, respectively, may be further included.

In some exemplary embodiments, the emission layer 540 may be an organic emission layer. In an alternative exemplary embodiment of the disclosure, the emission layer 540 may be a quantum-dot emission layer.

The second electrode 550 may be disposed on the emission layer 540 and the pixel-defining layer 530. In one exemplary embodiment, for example, the second electrode 550 may be disposed entirely on the emission layer 540 and the pixel-defining layer 530. In some exemplary embodiments, the second electrode 550 may be a cathode electrode.

The first electrode 520, the second electrode 550 and the emission layer 540 may collectively define a self-luminous element EL.

The encapsulation layer 570 may be disposed on the self-luminous element EL. The encapsulation layer 570 may seal the self-luminous element EL and effectively prevent moisture or the like from permeating into the self-luminous element EL from the outside.

In some exemplary embodiments, the encapsulation layer 570 may be formed of a thin-film encapsulation, and may include one or more organic films and one or more inorganic films. In one exemplary embodiment, for example, the encapsulation layer 570 may include a first inorganic layer 571 disposed on the second electrode 550, an organic layer 572 disposed on the first inorganic layer 571, and a second inorganic layer 573 disposed on the organic layer 572.

The first inorganic layer 571 may effectively prevent moisture, oxygen and the like from permeating into the self-luminous element EL. The first inorganic layer 571 may include or be made of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride (SiON), etc.

The organic layer 572 may be disposed on the first inorganic layer 571. The organic layer 572 may improve the flatness or provide a flat surface on layers therebelow. The organic layer 572 may include or be formed of a liquid organic material. The organic layer 572 may include or be formed of an acrylic resin, a methacrylic resin, polyisoprene, a vinyl resin, an epoxy resin, an urethane resin, a cellulose resin, a perylene resin, etc. Such organic material may be provided on the base substrate 510 through deposition, printing and coating and may be subjected to a curing process.

The second inorganic layer 573 may be disposed on the organic layer 572. The second inorganic layer 573 may perform substantially the same or similar function as the first inorganic layer 571, and may include or be made of a material substantially the same as or similar to the first inorganic layer 571. The second inorganic layer 573 may completely cover the organic layer 572. In some exemplary embodiments, the second inorganic layer 573 and the first inorganic layer 571 may come in contact with each other in the non-display area NDA to form an inorganic-inorganic junction.

However, the structure of the encapsulation layer 570 is not limited thereto but may vary depending on implementations. In an alternative exemplary embodiment, the encapsulation layer 570 may include or be formed of a glass substrate or the like.

In some exemplary embodiments, the input sensing element 300 may be disposed on the encapsulation layer 570.

Figure 5:
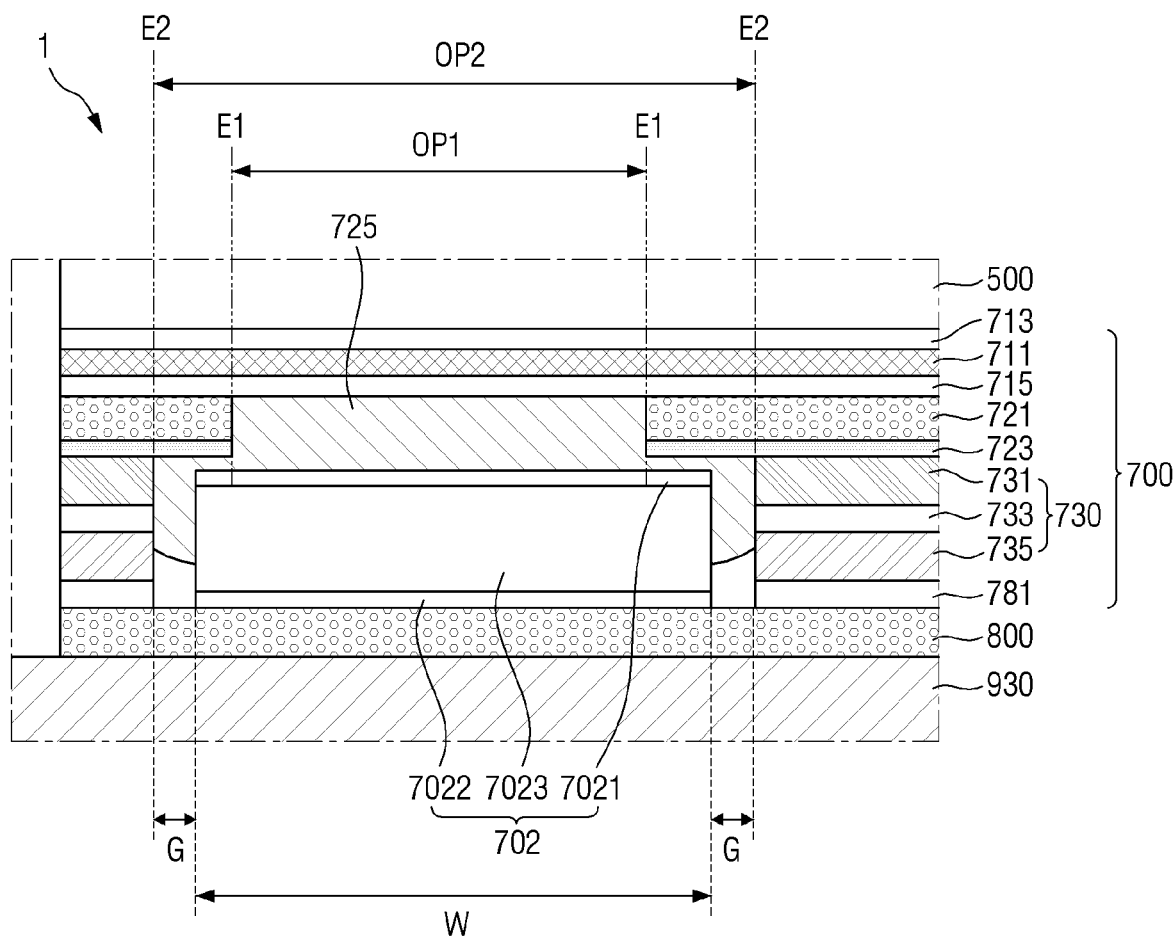
FIG. 5 is an enlarged cross-sectional view of the portion Q2 of FIG. 3, and more specifically, an enlarged cross-sectional view of the bottom member of FIG. 3.
Figure 6:
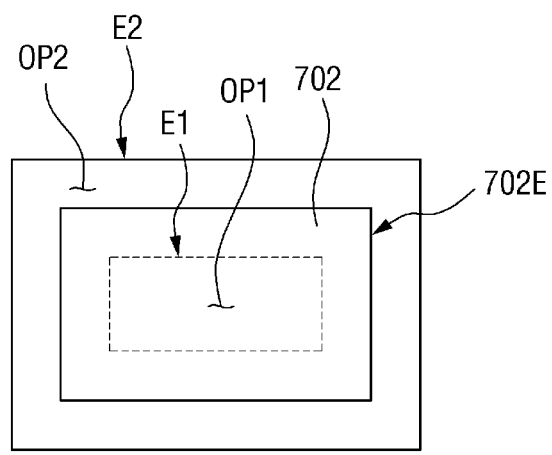
FIG. 6 is a rear view showing the relationship between a first opening, a second opening and a vibrating acoustic element of FIG. 5.
Figure 6:
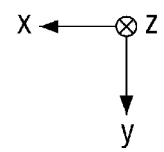
Figure 7:
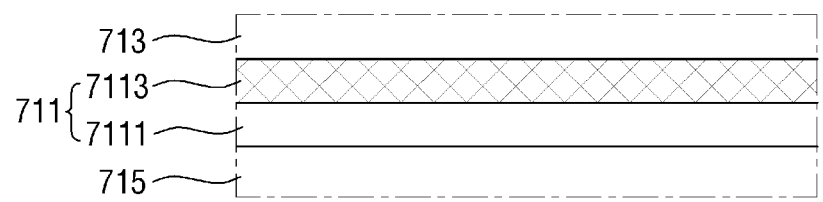
FIG. 7 is a cross-sectional view of the structure of a light-absorbing element of FIG. 5.
Figure 8:
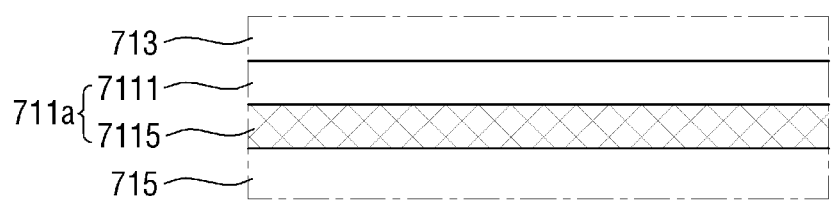
FIGS. 8 and 9 are views showing modifications of the structure shown in FIG. 7.
Figure 9:
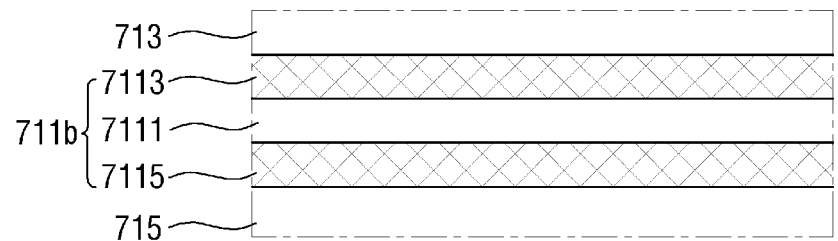

FIG. 5 is an enlarged cross-sectional view of the portion Q2 of FIG. 3, and more specifically, an enlarged cross-sectional view of the bottom member of FIG. 3. FIG. 6 is a rear view showing the relationship between a first opening, a second opening and a vibrating acoustic element of FIG. 5, specifically, a rear view showing the relationship between the vibrating acoustic element, the first opening and the second opening disposed in the first side area. FIG. 7 is a cross-sectional view of the structure of a light-absorbing element of FIG. 5. FIGS. 8 and 9 are views showing modifications of the structure shown in FIG. 7.

Referring to FIGS. 3 and 5 to 9, in an exemplary embodiment, the functional layer portion 701 of the bottom member 700 includes a light-absorbing element 711 disposed below the display panel 500, a top coupling layer 713 disposed between the light-absorbing element 711 and the display panel 500, a first coupling layer 715 disposed under the light-absorbing element 711, a first buffer element 721 disposed under the first coupling layer 715, and a second coupling layer 723 disposed under the first buffer element 721. In such an embodiment, the functional layer portion 701 of the bottom member 700 may further include a heat-dissipating element 730 disposed under the second coupling layer 723. In such an embodiment, the functional layer portion 701 of the bottom member 700 may further include a bottom coupling element 781 disposed under the heat-dissipating element 730.

The light-absorbing element 711 is disposed below the display panel 500 to block transmission of light and to effectively prevent the elements disposed thereunder from being seen from an outside of the display device 1.

The light-absorbing element 711 may have at least one of various structures.

In one exemplary embodiment, for example, the light-absorbing element 711 may include a base 7111 and a first light-absorbing layer 7113 disposed on the base 7111 as shown in FIG. 7. The top coupling layer 713 may be disposed on the first light-absorbing layer 7113, and the first coupling layer 715 may be disposed under the base 7111.

The base 7111 may include or be made of, for example, PET, PI, PC, polyethylene ("PE"), polypropylene ("PP"), polysulfone ("PSF"), polymethylmethacrylate ("PMMA"), triacetylcellulose ("TAC"), cycloolefin polymer ("COP"), etc.

The first light-absorbing layer 7113 is disposed on the base 7111. The first light-absorbing layer 7113 may be disposed directly on the base 7111. The first light-absorbing layer 7113 may be disposed to completely cover the vibrating acoustic element 702 disposed therebelow. In such an embodiment, the vibrating acoustic element 702 may completely overlap with the first light-absorbing layer 7113. In some exemplary embodiments, the first light-absorbing layer 7113 may be disposed to completely cover the functional layers disposed therebelow. The first light-absorbing layer 7113 may be disposed on the entire upper surface of the base 7111.

The first light-absorbing layer 7113 blocks transmission of light to thereby prevent the vibrating acoustic element 702 and the like disposed therebelow from being seen from above. The first light-absorbing layer 7113 may include a material that absorbs light, such as a black pigment or a dye. The first light-absorbing layer 7113 may include a black ink, for example. The first light-absorbing layer 7113 may be provided or formed on the upper surface of the base 7111 by coating or printing.

Although the first light-absorbing layer 7113 may be disposed on the base 7111 in an exemplary embodiment, this is merely illustrative or exemplary.

In one alternative exemplary embodiment, for example, a light-absorbing element 711a may include a base 7111 and a second light-absorbing layer 7115 disposed under the base 7111 as shown in FIG. 8. The top coupling layer 713 may be disposed on the base 7111, and the first coupling layer 715 may be disposed under the second light-absorbing layer 7115. The second light-absorbing layer 7115 may be disposed to completely cover the vibrating acoustic element 702 disposed therebelow. The second light-absorbing layer 7115 is substantially the same as or similar to the first light-absorbing layer 7113 described above and, any repetitive detailed description thereof will be omitted.

In another alternative exemplary embodiment, as shown in FIG. 9, a light-absorbing element 711b may include a base 7111, a first light-absorbing layer 7113 disposed on the base substrate 7111, and a second light-absorbing layer 7115 disposed under the base 7111. The top coupling layer 713 may be disposed on the first light-absorbing layer 7113, and the first coupling layer 715 may be disposed under the second light-absorbing layer 7115.

Referring back to FIG. 5, the top coupling layer 713 is disposed on the light-absorbing element 711. The top coupling layer 713 serves to attach the bottom member 700 to the lower surface of the display panel 500. The top coupling layer 713 may include an adhesive layer or a resin layer. In one exemplary embodiment, for example, the top coupling layer 713 may include a polymer material, e.g., a silicone polymer, a urethane polymer, an SU polymer having silicone-urethane hybrid structure, an acrylic polymer, an isocyanate polymer, a polyvinyl alcohol polymer, a gelatin polymer, a vinyl polymer, a latex polymer, polyester polymer, water-based polyester polymer, etc.

The first coupling layer 715 is disposed under the light-absorbing element 711. The first coupling layer 715 couples the light-absorbing element 711 and the first buffer element 721 to each other. The material of the first coupling layer 715 may be selected from among the above-listed materials of the top coupling layer 713.

The first buffer element 721 is disposed under the first coupling layer 715. The first buffer element 721 absorbs an external impact to prevent the display panel 500, the window 100 and the like from being damaged. The first buffer element 721 may have a single layer structure or a stack structure including multiple layers. In one exemplary embodiment, for example, the first buffer element 721 may include or be formed of a polymer resin such as polyurethane, polycarbonate, polypropylene and polyethylene, or may include or be formed of a material having elasticity such as a rubber and a sponge obtained by foaming a urethane-based material or an acrylic-based material. The first buffer element 721 may be a cushion layer.

An opening may be defined in the first buffer element 721 in each of the side areas SA1 and SA2. In one exemplary embodiment, for example, a first opening OP1 may be defined in the first buffer element 721 in the first side area SA1, and a part of the first coupling layer 715 may be exposed via the first opening OP1. The first opening OP1 may define a path for transmitting the vibration generated in the vibrating acoustic element 702 to the display panel 500.

In some exemplary embodiments, as shown in FIG. 6, the periphery E1 of the first opening OP1 may form a closed loop when viewed from a top or from a plan view in a thickness direction of the light-absorbing element 711b.

The second coupling layer 723 may be disposed under the first buffer element 721. The second coupling layer 723 may couple the first buffer element 721 with the heat-dissipating element 730. In some exemplary embodiments, the first opening OP1 may be defined also in the second coupling layer 723. In one exemplary embodiment, for example, the first opening OP1 may be defined by the inner surface of the first buffer element 721 and the inner surface of the second coupling layer 723. The inner surface of the first buffer element 721 and the inner surface of the second coupling layer 723 may be located substantially on a same vertical line in a cross-sectional view.

The material of the second coupling layer 723 may be selected from at least one of the above-listed materials of the top coupling layer 713. In some embodiments, the second coupling layer 723 may be an OCA.

The heat-dissipating element 730 may be disposed under the second coupling layer 723 and may be coupled to the first buffer element 721 via the second coupling layer 723.

An opening may be defined in the heat-dissipating element 730 in each of the side areas SA1 and SA2. In one exemplary embodiment, for example, a second opening OP2 may be defined in the heat-dissipating element 730 in the first side area SA1, and a part of the first buffer element 721 may be exposed via the second opening OP2.

In some exemplary embodiments, as shown in FIG. 6, the periphery E2 of the second opening OP2 may form a closed loop when viewed from the top. The area of the second opening OP2 may be larger than the area of the first opening OP1 when viewed from the top. The periphery E2 of the second opening OP2 may be located on the outer side of the periphery E1 of the first opening OP1 and may surround the periphery E1 of the first opening OP1.

In some exemplary embodiments, the heat-dissipating element 730 may include a first heat dissipating layer 731, a second heat dissipating layer 735, and an interlayer coupling layer 733 disposed between the first heat dissipating layer 731 and the second heat dissipating layer 735.

The first heat dissipating layer 731 and the second heat dissipating layer 735 may include or be formed of materials having different heat dissipation characteristics from each other. In one exemplary embodiment, for example, the first heat dissipating layer 731 may be a graphite layer having high heat dissipation characteristics. The second heat dissipating layer 735 may be a metal layer and may include various materials capable of blocking electromagnetic waves and having high thermal conductivity. In one exemplary embodiment, for example, the second heat dissipating layer 735 may include a metal such as copper, nickel, ferrite and silver.

In some exemplary embodiments, the first heat dissipating layer 731 may be disposed below the first buffer element 721, and the second heat dissipating layer 735 may be disposed below the first heat dissipating layer 731.

The interlayer coupling layer 733 may be disposed between the first heat dissipating layer 731 and the second heat dissipating layer 735 and may couple the first heat dissipating layer 731 with the second heat dissipating layer 735. The material of the interlayer coupling layer 733 may be selected from at least one of the above-listed materials of the top coupling layer 713.

The second opening OP2 may be defined by the inner surface of the first heat dissipating layer 731, the inner surface of the second heat dissipating layer 735 and the inner surface of the interlayer coupling layer 733. The inner surface of the first heat dissipating layer 731, the inner surface of the second heat dissipating layer 735 and the inner surface of the interlayer coupling layer 733 may be located substantially on a same vertical line in the cross-sectional view.

In an exemplary embodiment, as shown in FIG. 5, a filling layer 725 may be located in the first opening OP1. The first opening OP1 may be filled with the filling layer 725. The filling layer 725 in the first opening OP1 may connect the first buffer element 721 with the vibrating acoustic element 702. In an exemplary embodiment, the filling layer 725 may work as a medium for transmitting the vibration generated in the vibrating acoustic element 702 to the display panel 500. In some exemplary embodiments, the filling layer 725 may include or be made of a material having a vibration transmissibility higher than that of the first buffer element 721 or a material having an absorptivity of vibration lower than that of the first buffer element 721. In some exemplary embodiments, the filling layer 725 may have a hardness greater than that of the first buffer element 721. In some exemplary embodiments, the filling layer 725 may include or be made of adhesive resin, for example, an OCR. In such an embodiment, the hardness of the hardened filling layer 725 may be larger than the hardness of the first buffer element 721.

The vibrating acoustic element 702 may be disposed in the second opening OP2. The vibrating acoustic element 702 may be coupled to the first buffer element 721 via the filling layer 725.

The first opening OP1 may overlap with the vibrating acoustic element 702 when viewed from the top. In some exemplary embodiments, as shown in FIG. 6, the periphery E1 of the first opening OP1 may fall within the periphery of the vibrating acoustic element 702. In such embodiments, the first opening OP1 may completely overlap with the vibrating acoustic element 702.

The width W of the vibrating acoustic element 702 measured along a direction (e.g., the y-axis direction) may be larger than the width of the first opening OP1 measured along the same direction (e.g., the y-axis direction). Therefore, a part of the vibrating acoustic element 702 may overlap with the first buffer element 721. As the first buffer element 721 partially overlaps with the vibrating acoustic element 702, the first buffer element 721 may absorb an external impact to prevent the vibrating acoustic element 702 from being broken. As a result, the impact resistance of the vibrating acoustic element 702 may be improved.

In an exemplary embodiment, the area of the vibrating acoustic element 702 may be larger than the area of the first opening OP1 and smaller than the area of the second opening OP2 when viewed from the top. In such an embodiment, where the second opening OP2 is formed to have a larger area than the vibrating acoustic element 702, a margin for a process of coupling the vibrating acoustic element 702 with the first buffer element 721 is provided.

In an exemplary embodiment, as shown in FIG. 6, the periphery 702E of the vibrating acoustic element 702 may completely surround the periphery E1 of the first opening OP1, and the periphery E2 of the second opening OP2 may completely surround the periphery 702E of the vibrating acoustic element 702.

In an exemplary embodiment, the periphery E2 of the second opening OP2 may be located more to the outside than the periphery 702E of the vibrating acoustic element 702. Therefore, the heat-dissipating element 730 may be spaced apart from the vibrating acoustic element 702. In such an embodiment, a gap G is defined between the vibrating acoustic element 702 and each of the inner surface of the first heat dissipating layer 731, the inner surface of the second heat dissipating layer 735 and the inner surface of the interlayer coupling layer 733 defining the second opening OP2.

A part of the filling layer 725 may be located in the gap G. That is, the filling layer 725 may be used to fill at least part of the gap G. Such structure may be provided by the following processes: attaching the first buffer element 721 and the second coupling layer 723 having the first opening OP1 defined therein to the first coupling layer 715; attaching the heat dissipating layer having the second opening OP2 defined therein to the second coupling layer 723; applying an adhesive resin for forming the filling layer 725 in the first opening OP1 and the second opening OP2; and coupling the vibrating acoustic element 702 onto the adhesive resin. In such an embodiment, since a part of the gap G is filled with the filling layer 725, the vibrating acoustic element 702 may be effectively prevented from moving due to an external impact or the like. As a result, the impact resistance of the vibrating acoustic element 702 may be further improved.

In an exemplary embodiment, as described above, the first opening OP1 may be defined also in the second coupling layer 723, and the filling layer 725 may be used to fill the first opening OP1. Accordingly, the filling layer 725 may be in contact with the inner surface of the first buffer element 721 and the inner surface of the second coupling layer 723 defining the first opening OP1 and may be in contact with the surface of the second coupling layer 723 not covered by the heat-dissipating element 730. In such an embodiment, as described above, the filling layer 725 may fill at least a part of the gap G. Accordingly, the filling layer 725 may also be in contact with the inner surface of the first heat dissipating layer 731 defining the second opening OP2 and the inner surface of the interlayer coupling layer 733 and the inner surface of the second heat dissipating layer 735. Although not shown in the drawings, in alternative exemplary embodiments, the filling layer 725 may also be in contact with the bottom coupling element 781. In other alternative exemplary embodiments, the filling layer 725 may be in contact with the inner surface of the first heat dissipating layer 731 and the inner surface of the interlayer coupling layer 733 but not with the inner surface of the second heat dissipating layer 735. In other alternative exemplary embodiments, the filling layer 725 may be in contact with the inner surface of the first heat dissipating layer 731 but not with the inner surface of the interlayer coupling layer 733 and the inner surface of the second heat dissipating layer 735.

The bottom coupling element 781 may be disposed under the heat-dissipating element 730. The bottom coupling element 781 couples the bottom member 700 with another element, e.g., a lower buffer element 800. In some exemplary embodiments, the second opening OP2 may be defined also in the bottom coupling element 781, and the bottom coupling element 781 may not overlap with the vibrating acoustic element 702. In some exemplary embodiments, the bottom coupling element 781 may be in the form of a tape having two coupling layers on two sides thereof, e.g., a double-sided adhesive tape.

The lower buffer element 800 may be disposed between the bottom member 700 and the bottom surface 930 of the bracket 900. The lower buffer element 800 may be disposed to overlap with the vibrating acoustic element 702 of the bottom member 700 and may absorb external impact to prevent the vibrating acoustic element 702 from being broken. In an exemplary embodiment, as shown in FIG. 5, the lower buffer element 800 overlaps with the heat-dissipating element 730 as well as the vibrating acoustic element 702 and the like, but not being limited thereto. Alternatively, the lower buffer element 800 may overlap with the vibrating acoustic element 702 but not with the heat-dissipating element 730. The lower buffer element 800 may be attached to the bottom coupling element 781 of the bottom member 700 and may include a same material as the first buffer element 721 or may include one or more materials selected from the above-listed materials of the first buffer element 721.

In such an embodiment, as the lower buffer element 800 is disposed between the bracket 900 and the vibrating acoustic element 702, the impact resistance of the vibrating acoustic element 702 can be further improved. In such an embodiment, by disposing the lower buffer element 800, the vibration generated by the vibrating acoustic element 702 may be effectively prevented from being transmitted to the back side of the bracket 900, and sound generated by the vibration of the vibrating acoustic element 702 may be effectively prevented from emitting toward the back side of the display device 1.

Hereinafter, the characteristics of the vibrating acoustic element and the process of generating sound thereby will be described with reference to FIGS. 21 and 22.

Figure 21:
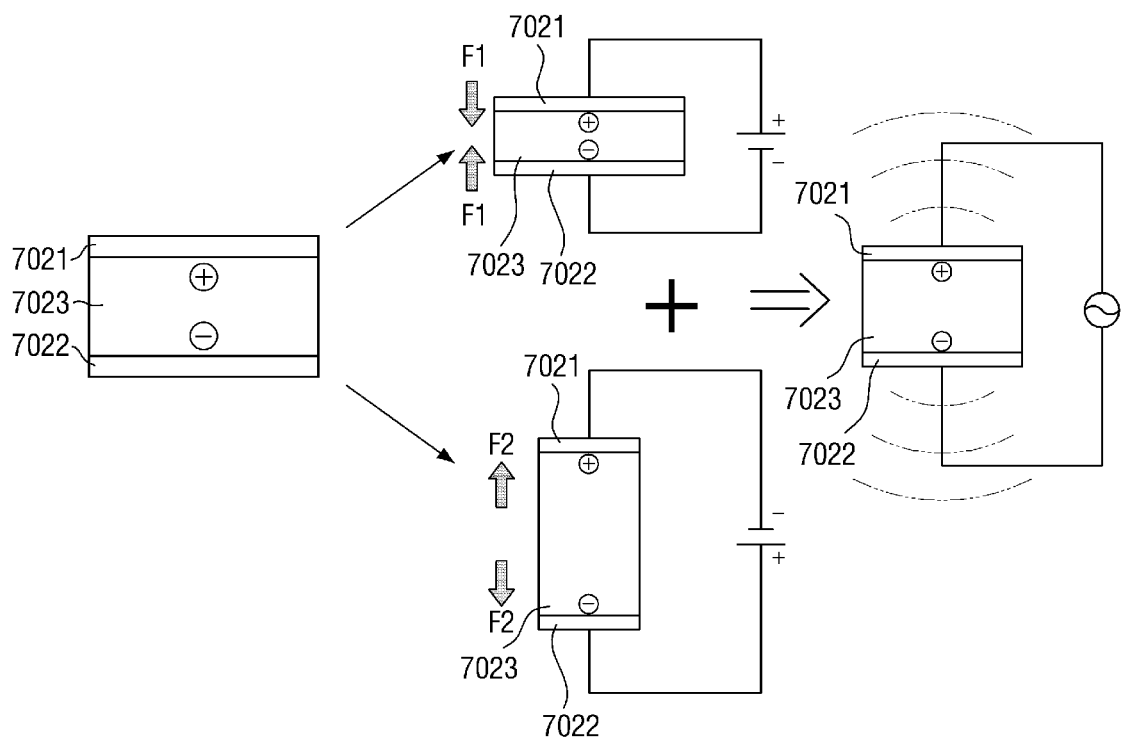
FIG. 21 is a view conceptually illustrating characteristics of the vibrating acoustic element.

FIG. 21 is a view conceptually illustrating characteristics of the vibrating acoustic element. FIG. 22 is a view conceptually illustrating a process of generating sound by the vibrating acoustic element. FIG. 22 shows only the vibrating acoustic element 702, the light-absorbing element 711, the first buffer element 721, the filling layer 725 and the display panel 500 for convenience of illustration.

Figure 22:
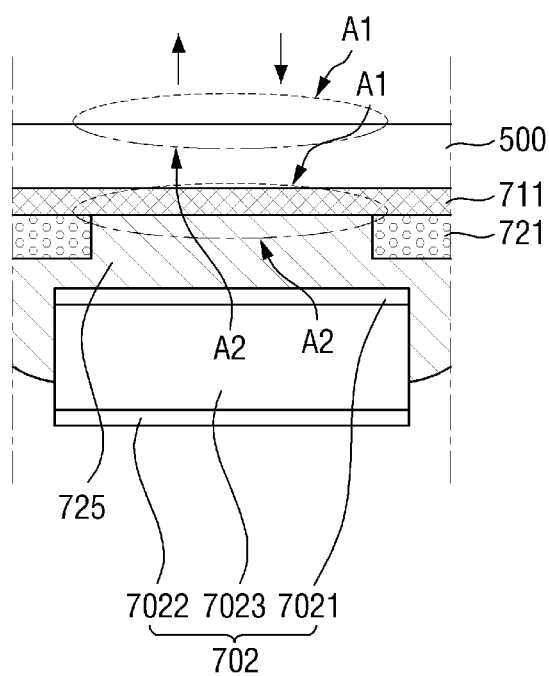
FIG. 22 is a view conceptually illustrating a process of generating sound by the vibrating acoustic element.

Referring to FIGS. 21 and 22, an exemplary embodiment of the vibrating acoustic element 702 may include a first electrode 7021, a vibrating material layer 7023 disposed under the first electrode 7021, and a second electrode 7022 disposed under the vibrating material layer 7023.

The first electrode 7021 and the second electrode 7022 provide an electric field to the vibrating material layer 7023. The first electrode 7021 and the second electrode 7022 may include or be made of a conductive material. In one exemplary embodiment, for example, the conductive material may be a transparent conductor such as indium tin oxide ("ITO") and indium zinc oxide ("IZO"), an opaque metal, a conducting polymer or a carbon nanotube ("CNT").

The vibrating material layer 7023 may include a piezoelectric material that vibrates by an electric field provided by the first electrode 7021 and the second electrode 7022. In an exemplary embodiment, the piezoelectric material may include at least one of a polyvinylidene fluoride ("PVDF") film, a piezoelectric material such as lead zirconate titanate ("PZT"), and an electroactive polymer.

The vibrating material layer 7023 contracts by receiving a first force F1, or relaxes or expands by receiving a second force F2 depending on the polarity of the applied voltage. Accordingly, when an alternating current ("AC") voltage is applied to each of the first electrode 7021 and the second electrode 7022, the vibrating material layer 7023 repeats contraction and expansion by the inverse piezoelectric effect. The vibrating acoustic element 702 repeats such contraction and expansion to generate vibrations.

As shown in FIG. 22, the first opening OP1 is defined in the first buffer element 721, and the first opening OP1 is filled with the filling layer 725. The vibration generated in the vibrating acoustic element 702 is transmitted to the filling layer 725 in the first opening OP1, and the vibration transmitted to the filling layer 725 is transmitted to the display panel 500. In such an embodiment, the filling layer 725 may work as a medium for transmitting vibration.

When the vibrating acoustic element 702 relaxes, the display panel 500 may be temporarily deformed upwardly as indicated by the dotted line A1. When the vibrating acoustic element 702 contracts, the display panel 500 may be temporarily deformed downwardly as indicated by the dotted line A2. As the vibrating acoustic element 702 repeats contraction and relaxation to vibrate, the display panel 500 also vibrates up and down to output sound.

In such an embodiment, the display panel 500 itself functions as a diaphragm of a speaker.

Typically, a speaker with a larger diaphragm exhibits stronger sound pressure of the sound outputted from the diaphragm and better output characteristic in the low-frequency range. Therefore, the intensity and the output characteristics in the low-frequency range of the sound output from the display panel 500 may be adjusted according to the area of the display panel 500. In particular, the size of a diaphragm of a typical speaker employed by an ordinary display device is much smaller than the area of the display panel. In an exemplary embodiment of the invention, the display device 1 uses the display panel 500 itself as a diaphragm, and thus the sound pressure level of the output sound or the output characteristic in the low-frequency range is improved compared to those of a conventional speaker of a display panel.

In such an embodiment, as the display device 1 includes no separate speaker and utilizes a part of the display panel 500 as a diaphragm, the size and thickness of the display device 1 may be reduced and the structure of the display device 1 may be simplified. In such an embodiment, as the vibrating acoustic element 702 may be disposed in the display area DA partially or entirely, the size of the display area DA may be increased.

In such an embodiment of the display device 1, the bottom member 700 includes the vibrating acoustic element 702, and thus the vibrating acoustic element 702 may be coupled with the display panel 500 via the process of coupling the bottom member 700 with the display panel 500, such that the process of producing the display device 1 may be simplified.

Hereinafter, additional features of the vibrating acoustic element will be described with reference to FIGS. 23 and 24.

Figure 23:
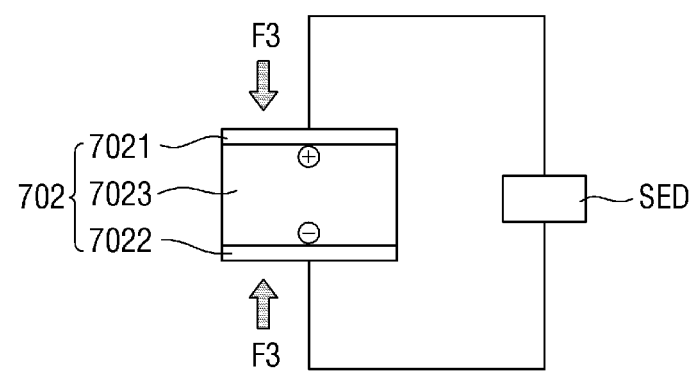
FIG. 23 is a view conceptually illustrating another feature of the vibrating acoustic element.

FIG. 23 is a view conceptually illustrating another feature of the vibrating acoustic element.

Referring to FIG. 23, an exemplary embodiment of the vibrating acoustic element 702 will be described in detail. The vibrating material layer 7023 generates sound while vibrating by an electric field. However, when the vibrating material layer 7023 vibrates by an external force F3 or the like without an electric field, a voltage is generated from the vibrating material layer 7023 by the piezoelectric effect. The generated voltage may be used to transmit sound information, position information of an object located outside the display device 1 and the like to the display device 1.

In one exemplary embodiment, for example, sound waves originating from an outside of the display device 1 may induce vibration in the display panel 500. Such vibration may be transmitted to the vibrating material layer 7023 of the vibrating acoustic element 702 to generate a voltage. The generated voltage may be used to transmit sound information to the display device 1.

In some exemplary embodiments, the display device 1 may further include a sensor SED for detecting a voltage generated in the vibrating material layer 7023. When the voltage sensed by the sensor SED is greater than a predetermined value, the voltage generated in the vibrating acoustic element 702 may be utilized for the operation of the display device 1.

Figure 24:
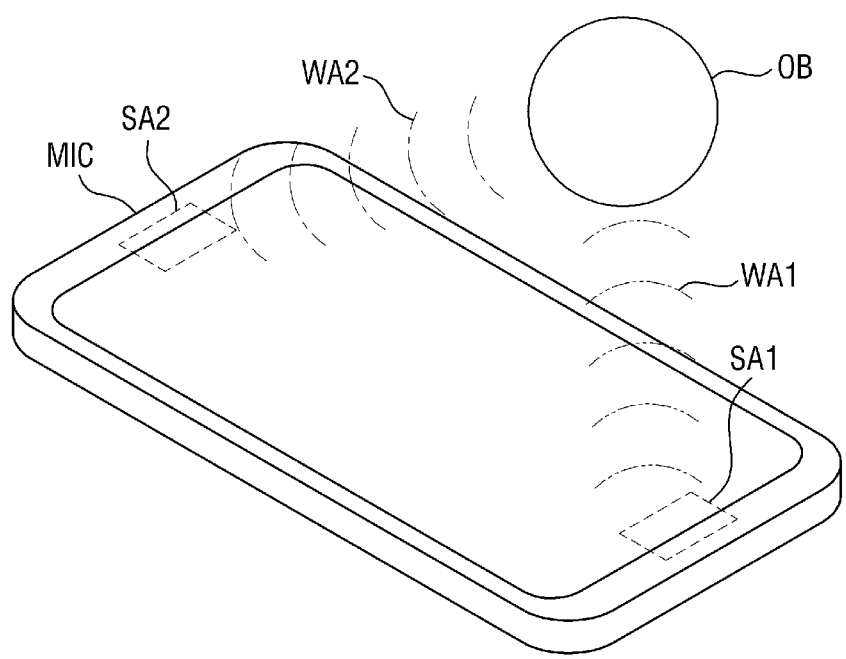
FIG. 24 is a view illustrating a proximity sensing operation using the vibrating acoustic element.

FIG. 24 is a view illustrating a proximity sensing operation of the display device using the vibrating acoustic element.

Referring to FIG. 24, when the vibrating acoustic element 702 disposed in the first side area SA1 of the display device 1 generates a high frequency or low frequency sound wave WA1 that is not an audible frequency, the generated sound wave is reflected by an object OB such as a user outside the display device 1. The sound wave WA2 reflected by the object OB may induce vibration in the display panel or the like. The induced vibration is transmitted to the vibrating acoustic element 702 disposed in the second side area SA2.

The vibrating acoustic element 702 disposed in the second side area SA2 may generate a voltage by the transmitted vibration, and may sense the proximity of the object OB using the voltage generated in the vibrating acoustic element 702.

In alternative exemplary embodiments, when the display device 1 includes a separate microphone MIC, the sound wave WA2 reflected by the object OB may be sensed using the microphone MIC, and the proximity of the object OB may be sensed by using the vibrating acoustic element 702.

In an exemplary embodiment, as described above, the display device 1 may perform not only the speaker functionality but also the proximity sensing functionality using the vibrating acoustic element without a separate proximity sensor. In such an embodiment, the display device 1 may perform various functionalities such as microphone functionality.

In such an embodiment, the vibrating acoustic elements may perform different operations depending on the operation of the display device 1.

In one exemplary embodiment, for example, when the display device 1 is making a call, the vibrating acoustic element 702 disposed in the first side area SA1 may perform speaker functionality for generating sound, while the vibrating acoustic element 702 disposed in the second side area SA2 may perform microphone functionality.

In an exemplary embodiment, when the display device 1 is playing a video or audio clip, the vibrating acoustic element 702 disposed in the first side area SA1 and the vibrating acoustic element 702 disposed in the second side area SA2 both may perform speaker functionality.

In an exemplary embodiment, when the display device 1 is receiving a touch input, the vibrating acoustic element 702 disposed in the first side area SA1 and/or the vibrating acoustic element 702 disposed in the second side area SA2 may perform functionality of generating vibration in response to the touch input, i.e., haptic functionality.

Figure 10:
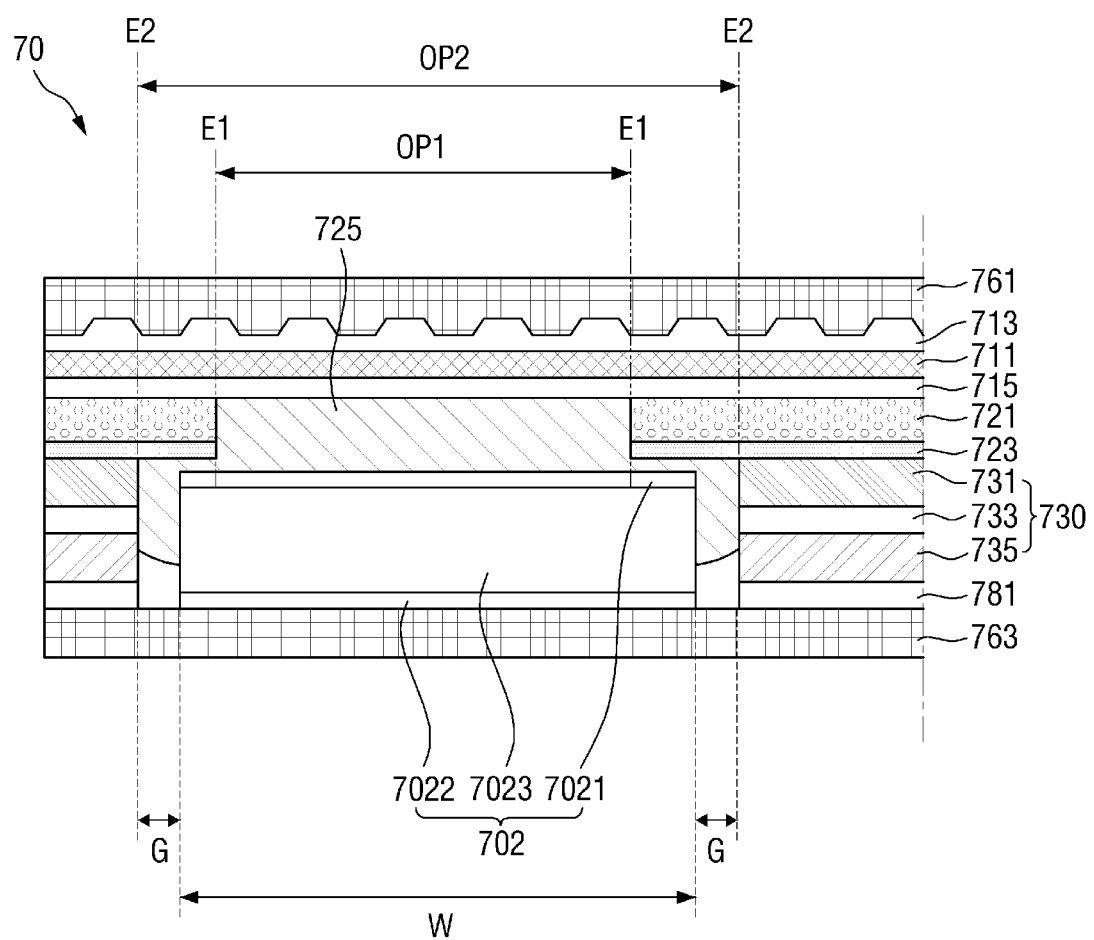
FIG. 10 is a cross-sectional view of a bottom member according to an exemplary embodiment of the disclosure.

FIG. 10 is a cross-sectional view of a bottom member according to an exemplary embodiment of the disclosure, and more specifically, a cross-sectional view showing a structure of the bottom member shown in FIG. 5 before the bottom member is attached to the display panel.

Referring to FIG. 10, the bottom member 70 includes a first release film 761 disposed on the upper surface of the top coupling layer 713. The first release film 761 covers and protects the upper surface of the top coupling layer 713 before the bottom member 70 is attached to the display panel 500. The first release film 761 is peeled off so that the upper surface of the top coupling layer 713 is exposed when the bottom member 70 is attached to the display panel 500.

The first release film 761 may be in contact with the top coupling layer 713, but not completely attached thereon, so that the first release film 761 may be peeled off in a subsequent process. The first release film 761 may include PET, PC, PI, paper, or the like. In one exemplary embodiment, for example, a silicone solution treatment may be performed on the upper surface of the first release film 761, or a release coating layer including a silicone resin may be formed on the upper surface of the first release film 761 to increase the releasing force of the first release film 761.

In some exemplary embodiments, the lower surface of the first release film 761 may have an embossed pattern. The embossed pattern of the lower surface of the first release film 761 is transferred to the upper surface of the top coupling layer 713 adjacent thereto, and accordingly the upper surface of the top coupling layer 713 may also have an embossed pattern complementary to the pattern of the lower surface shape of the first release film 761. In such embodiments, where the top coupling layer 713 has the embossed pattern on the upper surface thereof, the embossed shape serves as an air passage when the bottom member 70 is attached to the lower surface of the display panel 500, thereby reducing bubbles. When the top coupling layer 713 is completely attached to the lower surface of the display panel 500, the embossed pattern of the top coupling layer 713 may be collapsed and flattened as shown in FIG. 5.

The bottom member 70 may further include a second release film 763 disposed under the bottom coupling element 781. The second release film 763 may protect the lower surface of the bottom coupling element 781. The second release film 763 may be substantially identical to the first release film 761 described above. In an exemplary embodiment, as shown in FIG. 10, the upper surface of the second release film 763 has no embossed pattern, but not being limited thereto. Alternatively, the upper surface of the second release film 763 may have an embossed pattern like the lower surface of the first release film 761.

The other elements of the bottom member 70 are substantially identical to those of the bottom member 700 described above with reference to FIG. 5, and any repetitive detailed description thereof will be omitted.

In some exemplary embodiments, the first buffer element 721, the heat-dissipating element 730, and the vibrating acoustic element 702 may be combined by the following processes: preparing a structure, in which a first opening OP1 is defined such as the first buffer element 721 and the second coupling layer 723, and the heat-dissipating element 730 in which the second opening OP2 is defined; attaching the first buffer element 721 of the structure to the first coupling layer 715, and attaching the heat-dissipating element 730 to the second coupling layer 723; and applying an adhesive resin for forming the filling layer 725 in the first opening OP1, and attaching the vibrating acoustic element 702 to the adhesive resin. It is, however, to be understood that such processes are merely illustrative or exemplary. The first buffer element 721, the heat-dissipating element 730 and the vibrating acoustic element 702 may be coupled with one another in a variety of ways.

Figure 11:
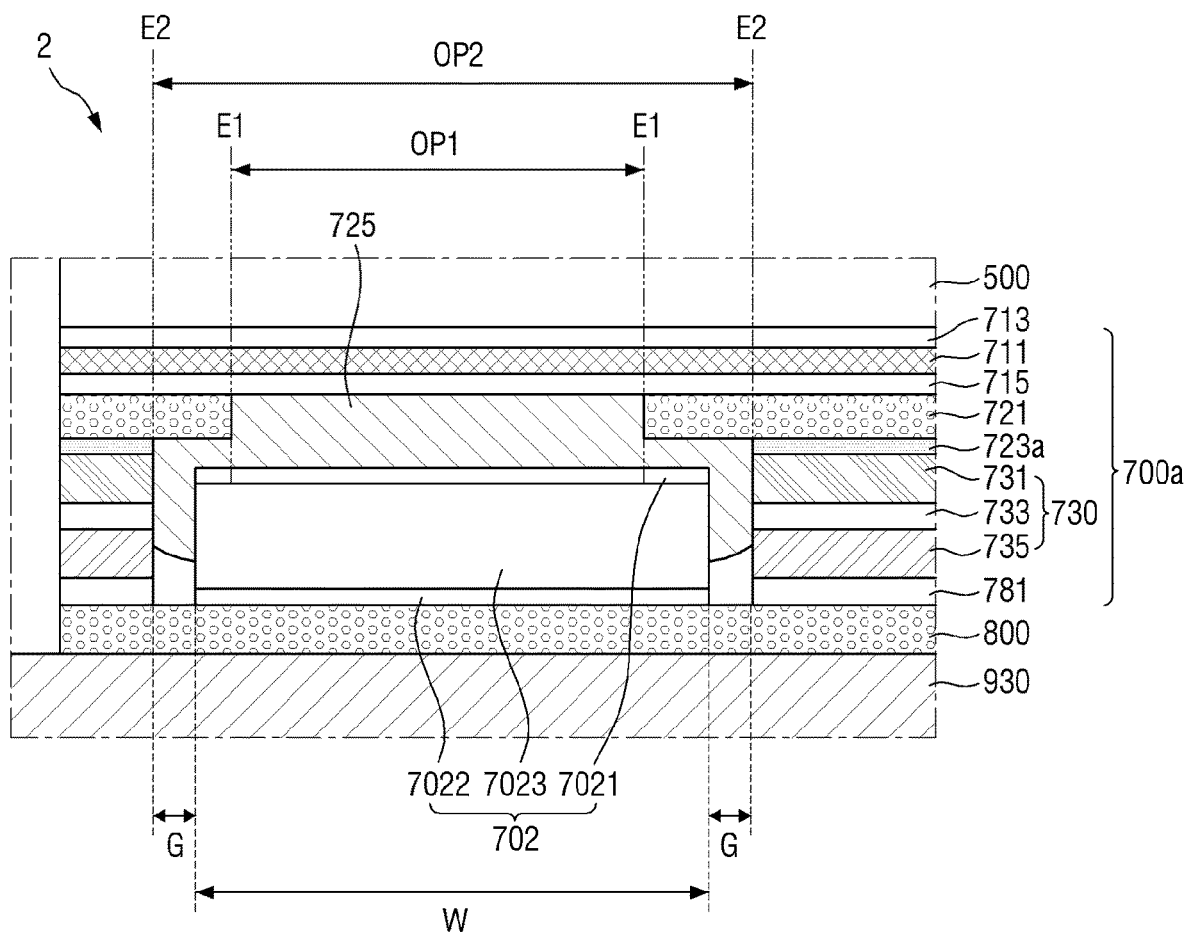
FIG. 11 is a cross-sectional view of a display device according to an alternative exemplary embodiment of the disclosure, taken along line X1-X2 of FIG. 3.
Figure 12:
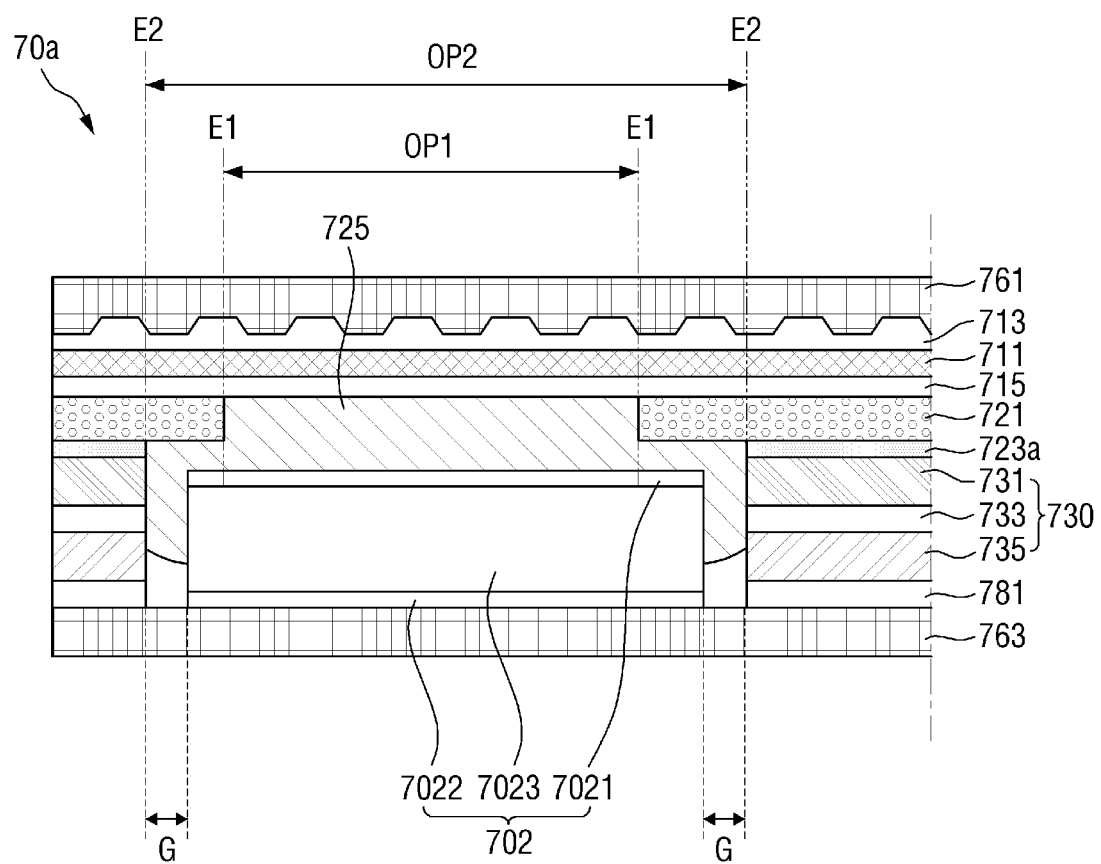
FIG. 12 is a cross-sectional view of a bottom member according to an alternative exemplary embodiment of the disclosure.

FIG. 11 is a cross-sectional view of a display device according to an alternative exemplary embodiment of the disclosure, taken along line X1-X2 of FIG. 3. FIG. 12 is a cross-sectional view of a bottom member according to an alternative exemplary embodiment of the disclosure.

The display device 2 shown in FIG. 11 is substantially identical to the display device shown in FIG. 5 except for a bottom member 700a and a second opening OP2 defined in a second coupling layer 723a of the bottom member 700a. Similarly, a bottom member 70a shown in FIG. 12 is substantially identical to the bottom member shown in FIG. 10 except for the second opening OP2 defined in the second coupling layer 723a. The same or like elements shown in FIGS. 11 and 12 have been labeled with the same reference characters as used above to describe the exemplary embodiments shown in FIGS. 5 and 10, and any repetitive detailed description thereof will hereinafter be omitted or simplified.

Referring to FIGS. 11 and 12, in an exemplary embodiment, the second opening OP2 may be defined further in the second coupling layer 723a. In such an embodiment, the second opening OP2 may be defined by the inner surface of the first heat dissipating layer 731, the inner surface of the second heat dissipating layer 735, the inner surface of the interlayer coupling layer 733, and the inner surface of the second coupling layer 723a. The inner surface of the first heat dissipating layer 731, the inner surface of the second heat dissipating layer 735, the inner surface of the interlayer coupling layer 733 and the inner surface of the second coupling layer 723a may be located substantially on a same vertical line in the cross-sectional view.

The second coupling layer 723a may be substantially completely covered by the heat-dissipating element 730. Accordingly, in such an embodiment, the filling layer 725 may be in contact with the inner surface of the second coupling layer 723a but not with the surface of the second coupling layer 723a facing the heat-dissipating element 730.

The first buffer element 721, the heat-dissipating element 730 and the vibrating acoustic element 702 shown in FIGS. 11 and 12 may be combined by the following processes: preparing the first buffer element 721 in which the first opening OP1 is defined, a structure in which the second opening OP2 is defined such as the second coupling layer 723a, and the heat-dissipating element 730; attaching the first buffer element 721 to the first coupling layer 715, and attaching the second coupling layer 723a of the structure to the first buffer element 721; and applying an adhesive resin for forming the filling layer 725 in the first opening OP1, and attaching the vibration acoustic element 702 to the adhesive resin.

Figure 13:
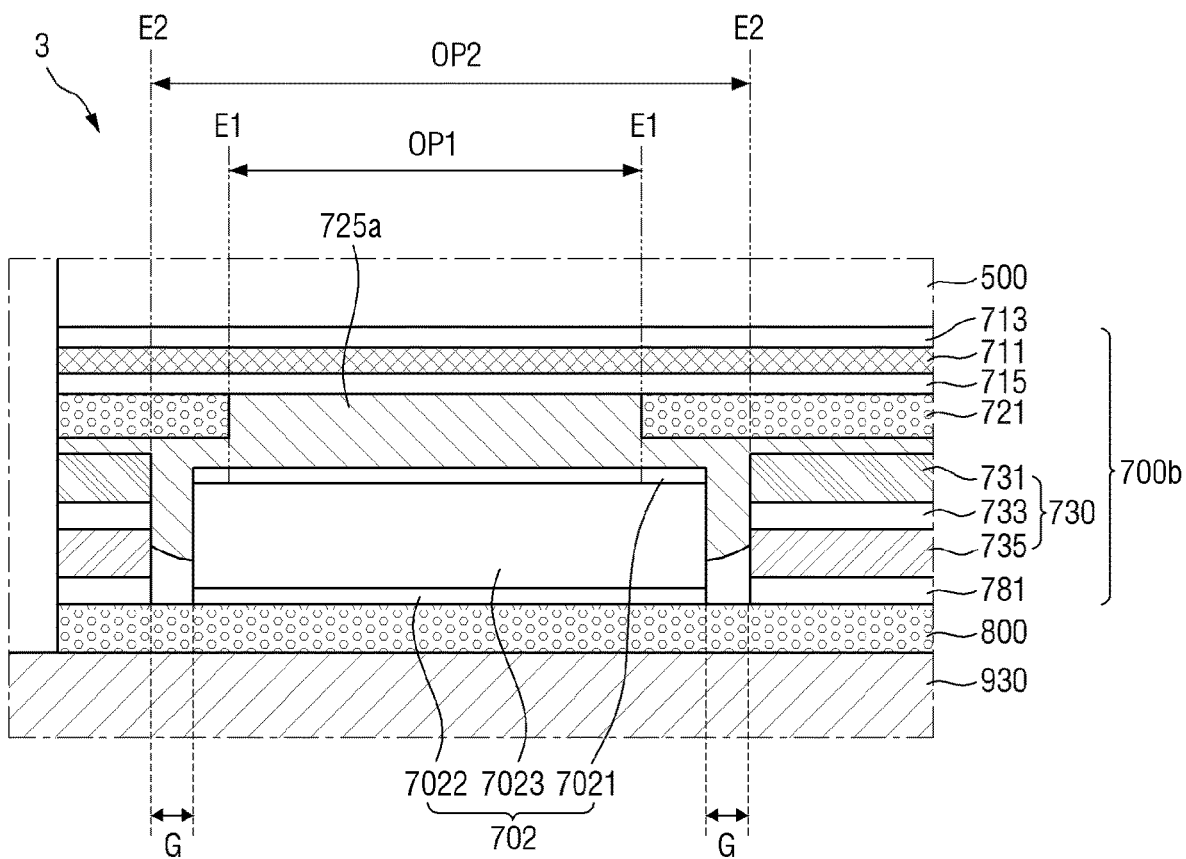
FIG. 13 is a cross-sectional view of a display device according to another alternative exemplary embodiment of the disclosure, taken along line X1-X2 of FIG. 3.
Figure 14:
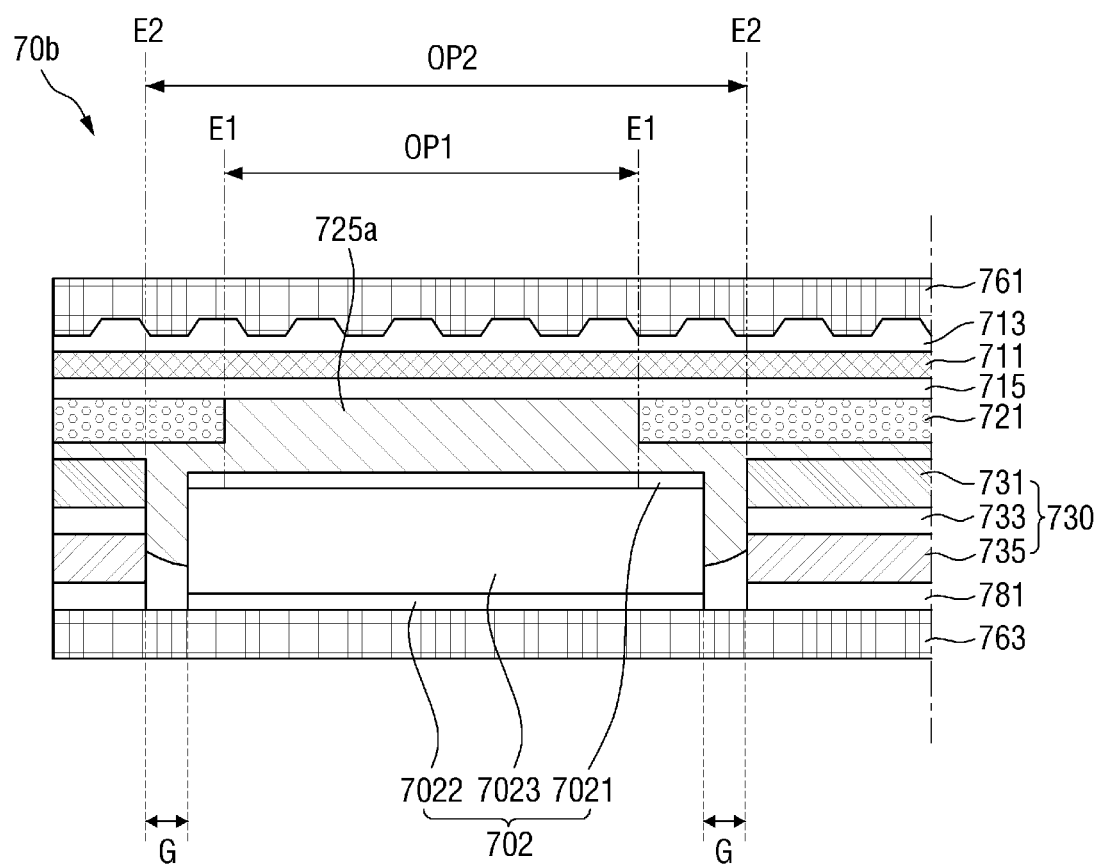
FIG. 14 is a cross-sectional view of a bottom member according to another alternative exemplary embodiment of the disclosure.

FIG. 13 is a cross-sectional view of a display device according to another alternative exemplary embodiment of the disclosure, taken along line X1-X2 of FIG. 3. FIG. 14 is a cross-sectional view of a bottom member according to another alternative exemplary embodiment of the disclosure.

The display device 3 shown in FIG. 13 is substantially identical to the display device shown in FIG. 5 except that the bottom member 700b does not include the second coupling layer 723. Similarly, a bottom member 70b shown in FIG. 14 is substantially identical to the bottom member shown in FIG. 10 except that the bottom member does not include the second coupling layer 723. The same or like elements shown in FIGS. 13 and 14 have been labeled with the same reference characters as used above to describe the exemplary embodiments shown in FIGS. 5 and 10, and any repetitive detailed description thereof will hereinafter be omitted or simplified.

Referring to FIGS. 13 and 14, in such an embodiment, a filler 725a may be further disposed between the first buffer element 721 and the heat-dissipating element 730. The heat-dissipating element 730 may be coupled with the first buffer element 721 via the filler 725a.

The first buffer element 721, the heat-dissipating element 730 and the vibrating acoustic element 702 shown in FIGS. 13 and 14 may be combined by the following processes: preparing the first buffer element 721 in which the first opening OP1 is defined, and the heat-dissipating element 730 in which the second opening OP2 is defined attaching the first buffer element 721 to the first coupling layer 715, and applying an adhesive resin entirely on a side of the first buffer element 721; and attaching the heat-dissipating element 730 to the adhesive resin, and attaching the vibrating acoustic element 702 to the adhesive resin.

Figure 15:
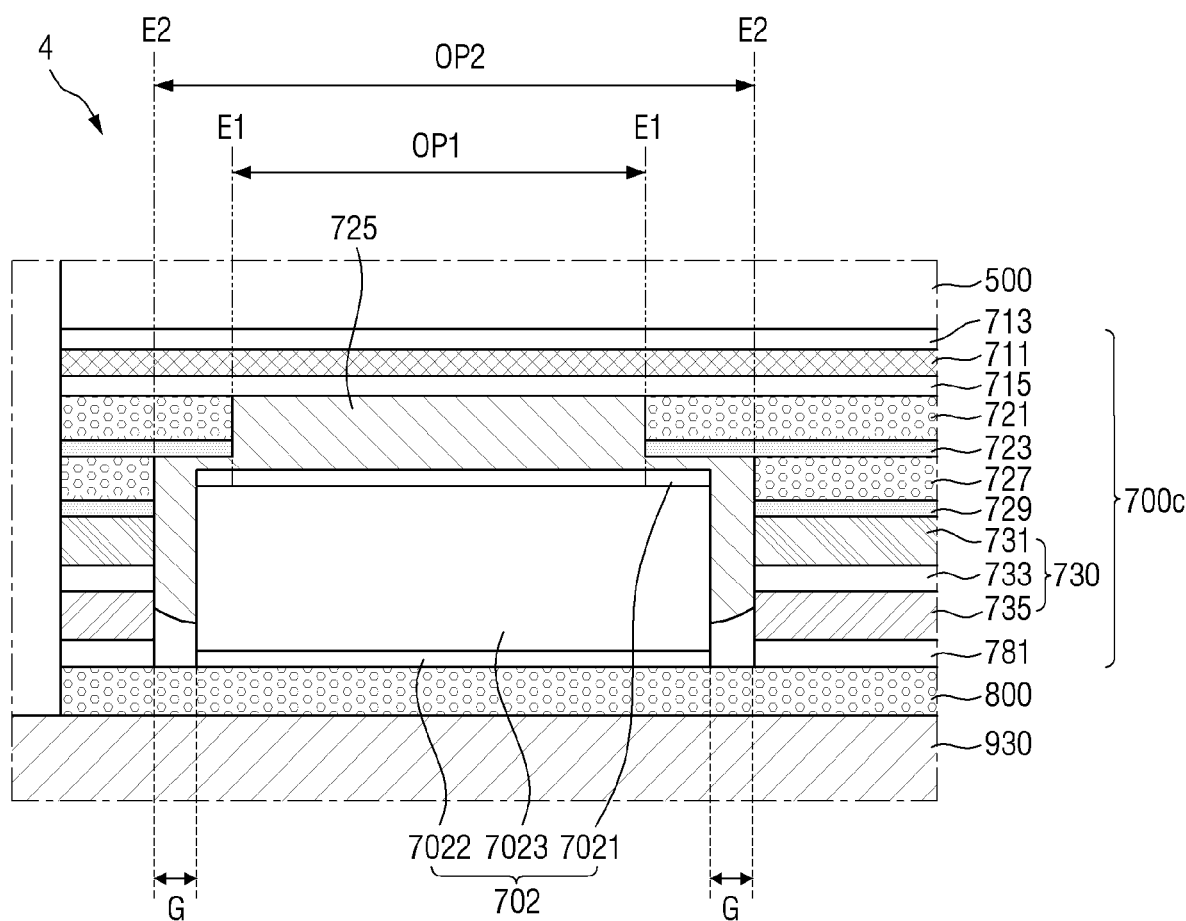
FIG. 15 is a cross-sectional view of a display device according to another alternative exemplary embodiment of the disclosure, taken along line X1-X2 of FIG. 3.
Figure 16:
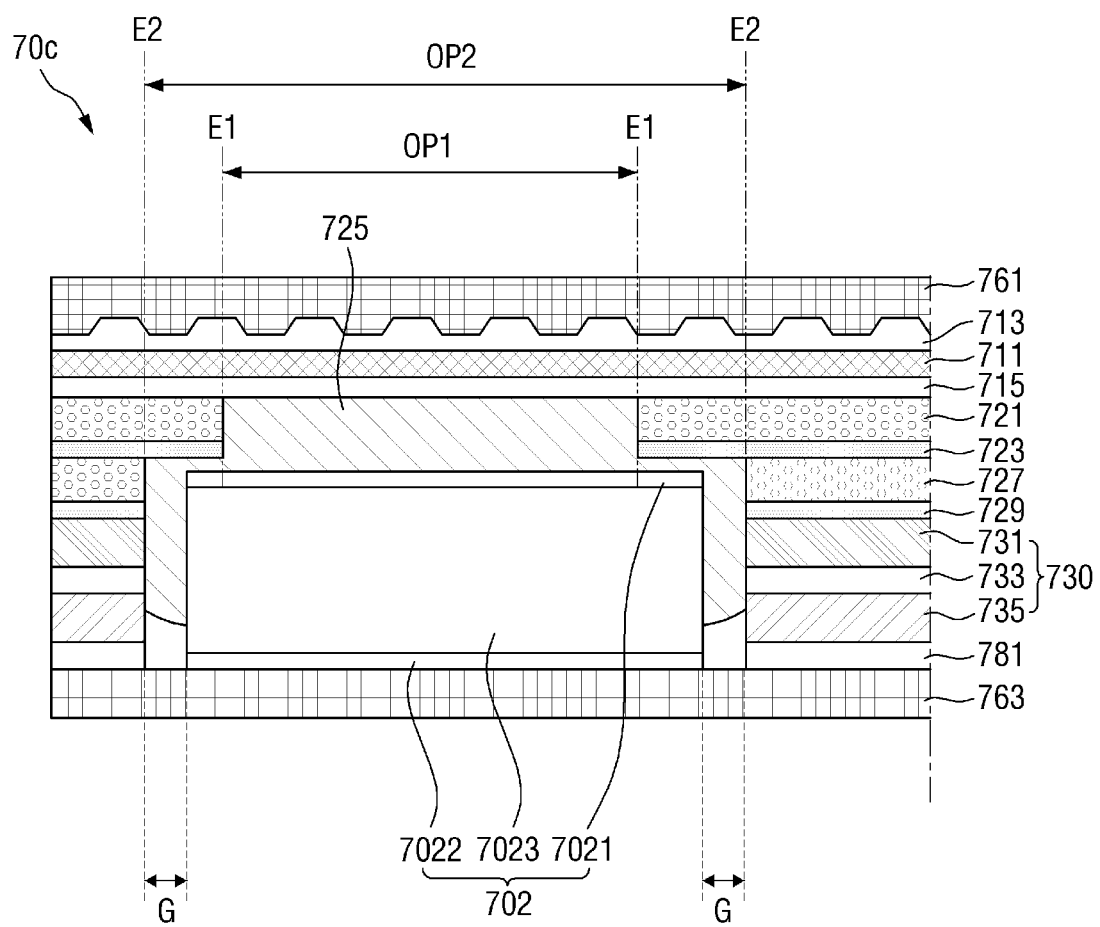
FIG. 16 is a cross-sectional view of a bottom member according to another alternative exemplary embodiment of the disclosure.

FIG. 15 is a cross-sectional view of a display device according to another alternative exemplary embodiment of the disclosure, taken along line X1-X2 of FIG. 3. FIG. 16 is a cross-sectional view of a bottom member according to another alternative exemplary embodiment of the disclosure.

The display device 4 shown in FIG. 15 is substantially identical to the display device shown in FIG. 5 except that the bottom member 700c further includes a second buffer element 727 and a third coupling layer 729. Similarly, a bottom member 70c shown in FIG. 16 is substantially identical to the bottom member shown in FIG. 10 except that the bottom member 70c further includes the second buffer element 727 and the third coupling layer 729. The same or like elements shown in FIGS. 15 and 16 have been labeled with the same reference characters as used above to describe the exemplary embodiments shown in FIGS. 5 and 10, and any repetitive detailed description thereof will hereinafter be omitted or simplified.

In such an embodiment, as shown in FIG. 16, the second buffer element 727 may be disposed under the second coupling layer 723. The second buffer element 727 may be coupled with the first buffer element 721 via the second coupling layer 723. The second buffer element 727 may include a same material as the first buffer element 721 or may include at least one material selected from the above-listed materials of the first buffer element 721.

In such an embodiment, the third coupling layer 729 may be disposed under the second buffer element 727, and the heat-dissipating element 730 may be disposed under the third coupling layer 729. The heat-dissipating element 730 may be coupled with the second buffer element 727 via the third coupling layer 729. The third coupling layer 729 may include a same material as the second coupling layer 723 or may include at least one material selected from the above-listed materials of the second coupling layer 723.

In some exemplary embodiments, the second opening OP2 may be defined further in the second buffer element 727 and the third coupling layer 729. In such embodiments, the second opening OP2 may be defined by the inner surface of the second buffer element 727, the inner surface of the third coupling layer 729, the inner surface of the first heat dissipating layer 731, the inner surface of the second heat dissipating layer 735 and the inner surface of the interlayer coupling layer 733. The inner surface of the second buffer element 727, the inner surface of the third coupling layer 729, and the inner surface of the first heat dissipating layer 731, the inner surface of the second heat dissipating layer 735 and the inner surface of the interlayer coupling layer 733 may be located substantially on a same vertical line in the cross-sectional view.

In some exemplary embodiments, a part of the filling layer 725 in the gap G may be further in contact with the inner surface of the second buffer element 727 and the inner surface of the third coupling layer 729.

The first buffer element 721, the second buffer element 727, the heat-dissipating element 730 and the vibrating acoustic element 702 shown in FIGS. 15 and 16 may be combined by the following processes: preparing a first structure in which the first opening OP1 is defined such as a structure including the first buffer element 721 and the second coupling layer 723, and preparing a second structure in which the second opening OP1 is defined such as a structure including the second buffer element 727, the third coupling layer 729 and the heat-dissipating element 730 attached to the third coupling layer 729; attaching the first buffer element 721 of the first structure to the first coupling layer 715, and attaching the second buffer element 727 of the second structure to the second coupling layer 723; and applying an adhesive resin for forming the filling layer 725 in the first opening OP1, and attaching the vibration acoustic element 702 to the adhesive resin. It is, however, to be understood that such processes are merely illustrative or exemplary. In an alternative exemplary embodiment, the first buffer element 721, the second buffer element 727, the heat-dissipating element 730 and the vibrating acoustic element 702 may be coupled with one another in a variety of ways.

Figure 17:
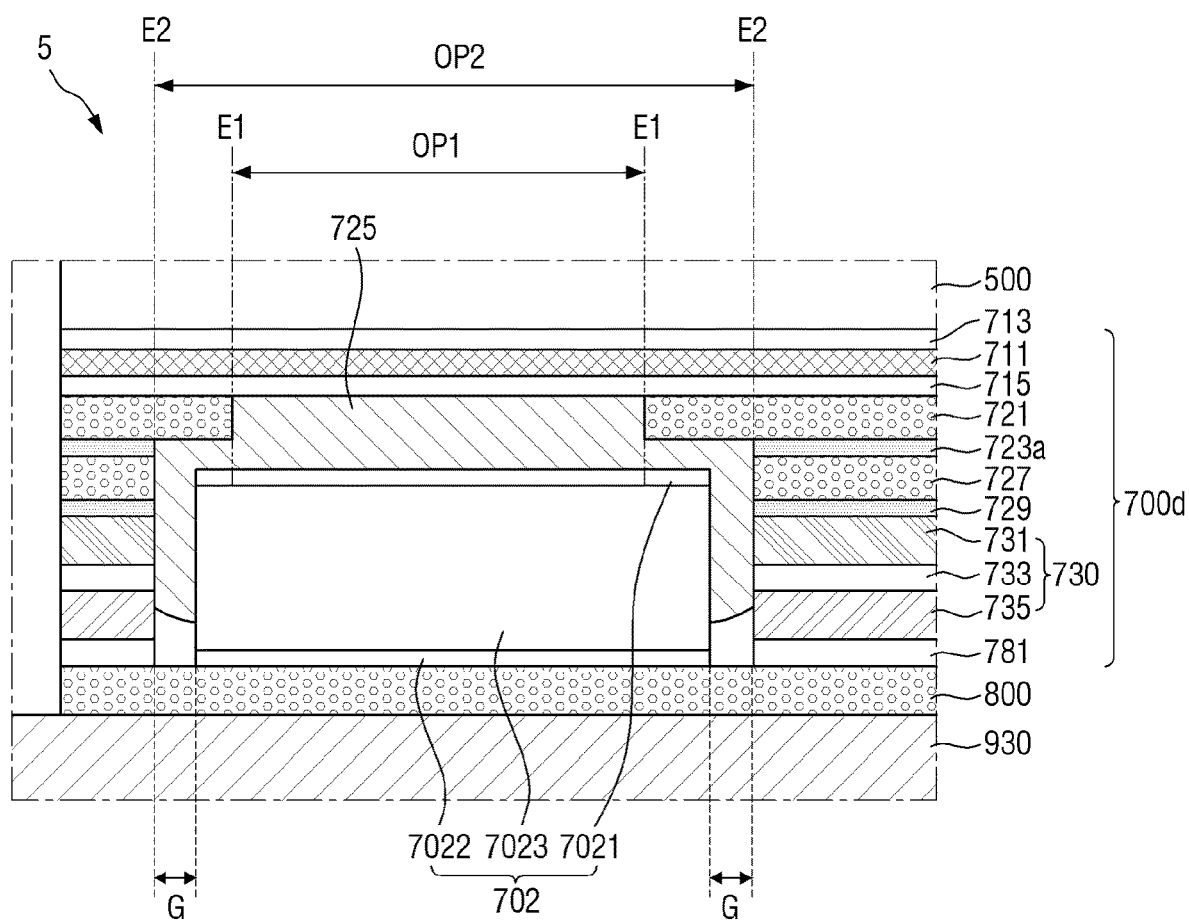
FIG. 17 is a cross-sectional view of a display device according to another alternative exemplary embodiment of the disclosure, taken along line X1-X2 of FIG. 3.
Figure 18:
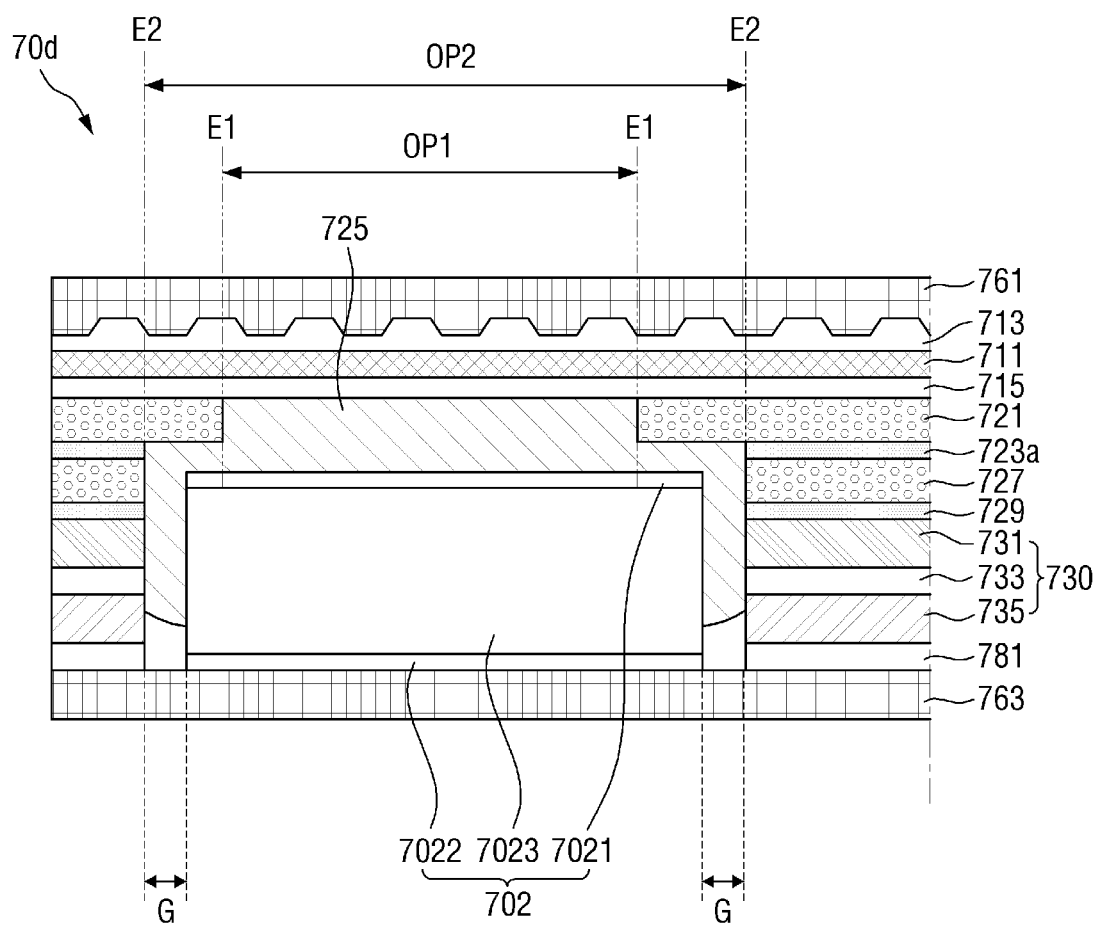
FIG. 18 is a cross-sectional view of a bottom member according to another alternative exemplary embodiment of the disclosure.

FIG. 17 is a cross-sectional view of a display device according to another alternative exemplary embodiment of the disclosure, taken along line X1-X2 of FIG. 3. FIG. 18 is a cross-sectional view of a bottom member according to another alternative exemplary embodiment of the disclosure.

The display device 5 shown in FIG. 17 is substantially identical to the display device shown in FIG. 15 except that a second opening OP2 is defined in a second coupling layer 723*a* of the bottom member 700*d*. Similarly, a bottom member 70*d* shown in FIG. 18 is substantially identical to the bottom member shown in FIG. 16 except that the second opening OP2 is defined in the second coupling layer 723*a*. The second coupling layer 723*a* is substantially identical to the second coupling layer of FIGS. 11 and 12 described above, and any repetitive detailed description thereof will be omitted.

The first buffer element 721, the second buffer element 727, the heat-dissipating element 730 and the vibrating acoustic element 702 shown in FIGS. 17 and 18 may be combined by the following processes: preparing the first buffer element 721 in which the first opening OP1 is defined, and preparing a structure in which the second opening OP1 is defined such as a structure including the second coupling layer 723*a*, the second buffer element 727 attached to the second coupling layer 723*a*, the third coupling layer 729 attached to the second buffer element 727, and the heat-dissipating element 730 attached to the third coupling layer 729; attaching the first buffer element 721 to the first coupling layer 715, and attaching the second coupling layer 723*a* of the structure to the first buffer element 721; applying an adhesive resin for forming the filling layer 725 in the first opening OP1, and attaching the vibration acoustic element 702 to the adhesive resin.

Figure 19:
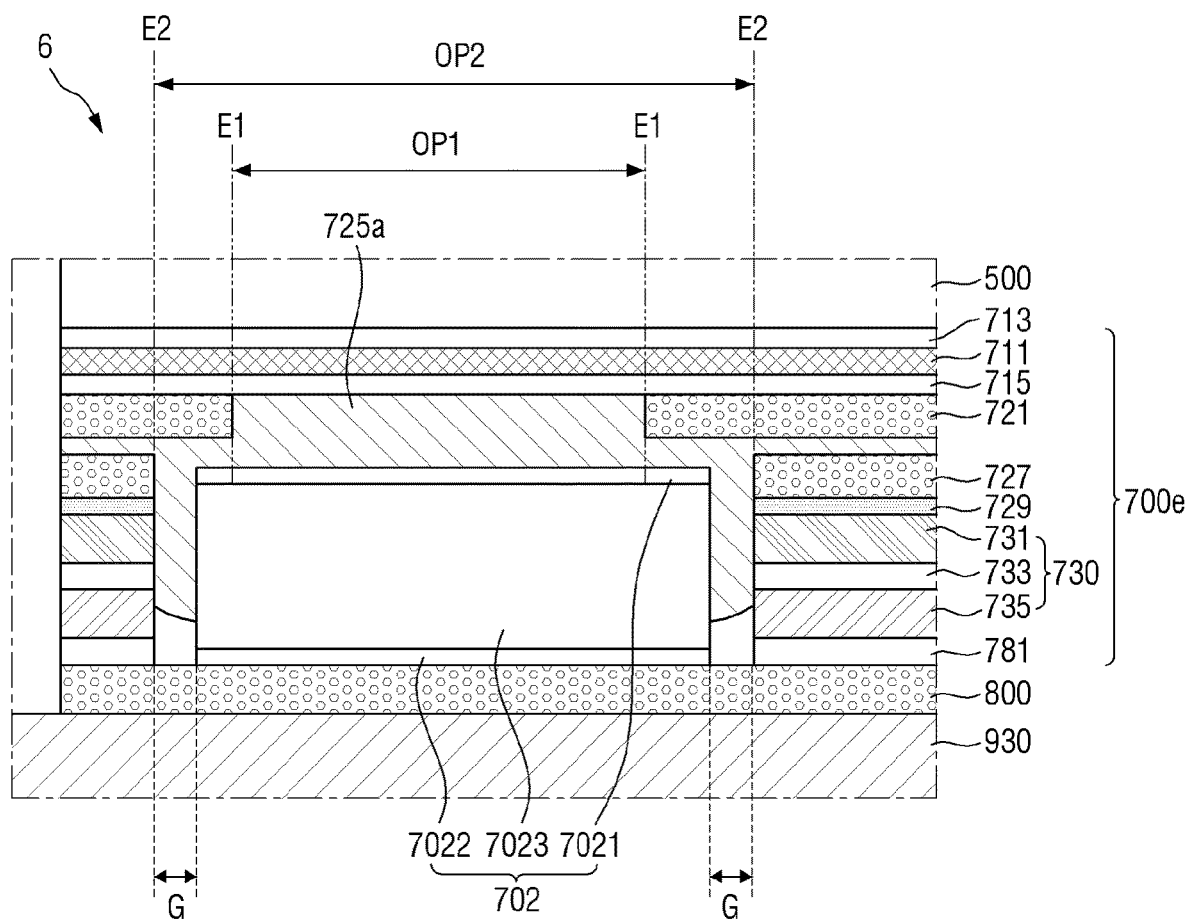
FIG. 19 is a cross-sectional view of a display device according to another alternative exemplary embodiment of the disclosure, taken along line X1-X2 of FIG. 3.
Figure 20:
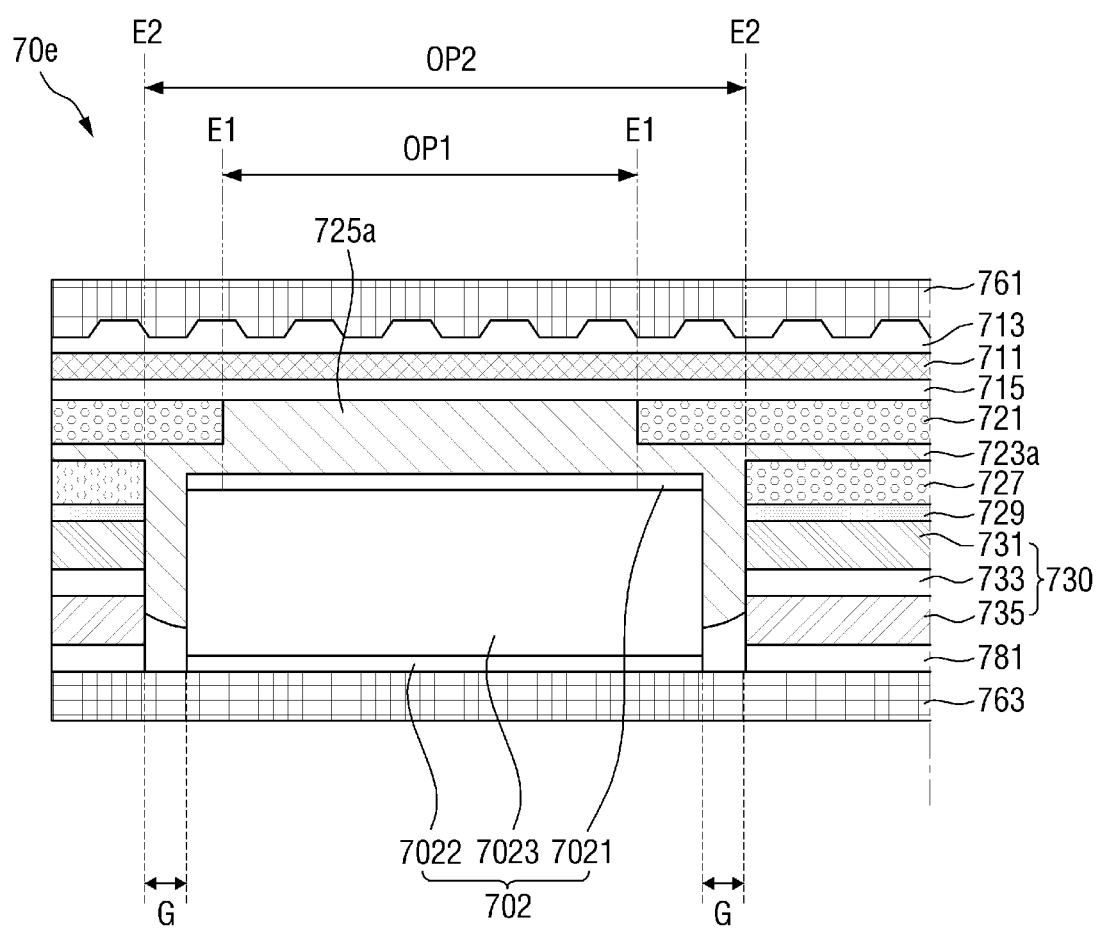
FIG. 20 is a cross-sectional view of a bottom member according to another alternative exemplary embodiment of the disclosure.

FIG. 19 is a cross-sectional view of a display device according to another alternative exemplary embodiment of the disclosure, taken along line X1-X2 of FIG. 3. FIG. 20 is a cross-sectional view of a bottom member according to another alternative exemplary embodiment of the disclosure.

The display device 6 shown in FIG. 19 is substantially identical to the display device shown in FIG. 15 except that the bottom member 700*e* does not include the second coupling layer. Similarly, a bottom member 70*e* shown in FIG. 20 is substantially identical to the bottom member shown in FIG. 16 except that the bottom member 70*e* does not include the second coupling layer. The same or like elements shown in FIGS. 19 and 20 have been labeled with the same reference characters as used above to describe the exemplary embodiments shown in FIGS. 15 and 16, and any repetitive detailed description thereof will hereinafter be omitted or simplified.

Referring to FIGS. 19 and 20, a filler 725*a* may be further disposed between the first buffer element 721 and the second buffer element 727. The second buffer element 727 may be coupled with the first buffer element 721 via the filler 725*a*.

The first buffer element 721, the second buffer element 727, the heat-dissipating element 730 and the vibrating acoustic element 702 shown in FIGS. 19 and 20 may be combined by the following processes: preparing a first buffer element 721 in which the first opening OP1 is defined, and preparing a structure in which the second opening OP1 is defined such as a structure including the second buffer element 727, the third coupling layer 729 attached to the second buffer element 727, and the heat-dissipating element 730 attached to the third coupling layer 729; attaching the first buffer element 721 to the first coupling layer 715, and applying an adhesive resin entirely on a side of the first buffer element 721; and attaching the second buffer element 727 of the structure to the adhesive resin, and attaching the vibrating acoustic element 702 to the adhesive resin.

According to the above-described exemplary embodiments, the impact resistance of the vibrating acoustic element may be improved, and thus the reliability of the display device may be improved.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A bottom member comprising:
   a light-absorbing element;
   a top coupling layer disposed on the light-absorbing element;
   a first buffer element disposed under the light-absorbing element, wherein a first opening is defined in the first buffer element;
   a filling layer disposed in the first opening; and
   a vibrating acoustic element disposed below the first buffer element,
   wherein the vibrating acoustic element overlaps with the first opening and the light-absorbing element when viewed from a top, and
   wherein the vibrating acoustic element is coupled with the first buffer element via the filling layer.

2. The bottom member of claim 1, wherein a width of the vibrating acoustic element measured along a direction is larger than a width of the first opening measured along the direction when viewed from the top.

3. The bottom member of claim 1, wherein a periphery of the vibrating acoustic element surrounds a periphery of the first opening when viewed from the top.

4. The bottom member of claim 1, further comprising:
   a heat-dissipating element disposed under the first buffer element,
   wherein a second opening is defined in the heat-dissipating element, and
   wherein the vibrating acoustic element is disposed inside the second opening.

5. The bottom member of claim 4, wherein
   a periphery of the vibrating acoustic element surrounds a periphery of the first opening when viewed from the top, and
   a periphery of the second opening surrounds the periphery of the vibrating acoustic element when viewed from the top.

6. The bottom member of claim 4, wherein
   the filling layer is further disposed in a gap between the heat-dissipating element and the vibrating acoustic element.

7. The bottom member of claim 4, further comprising:
a coupling layer disposed between the first buffer element and the heat-dissipating element and not overlapping with the vibrating acoustic element when viewed from the top,
wherein the heat-dissipating element is coupled with the first buffer element via the coupling layer.

8. The bottom member of claim 7, wherein
the first opening is further defined in the coupling layer, and
the filling layer is in contact with a side surface of the coupling layer defining the first opening and a surface of the coupling layer facing the second opening in the heat-dissipating element.

9. The bottom member of claim 8, wherein the filling layer is further in contact with a side surface of the heat-dissipating element defining the second opening.

10. The bottom member of claim 7, wherein
the second opening is further defined in the coupling layer, and
the filling layer is in contact with a side surface of the coupling layer defining the second opening and not in contact with a surface of the coupling layer facing the heat-dissipating element.

11. The bottom member of claim 10, wherein the filling layer is further in contact with a side surface of the heat-dissipating element defining the second opening.

12. The bottom member of claim 4, wherein
the filling layer is further disposed between the first buffer element and the heat-dissipating element, and
the heat-dissipating element is coupled with the first buffer element via the filling layer.

13. The bottom member of claim 4, wherein the heat-dissipating element comprises:
a graphite layer disposed under the first buffer element;
a metal layer disposed under the graphite layer; and
an interlayer coupling layer disposed between the graphite layer and the metal layer, and
wherein at least one of the graphite layer, the metal layer and the interlayer coupling layer is in contact with the filling layer.

14. The bottom member of claim 1, further comprising:
a second buffer element disposed under the first buffer element,
wherein the second buffer element is coupled with the first buffer element, a second opening is further defined in the second buffer element, and
the vibrating acoustic element is disposed inside the second opening.

15. The bottom member of claim 14, further comprising:
a coupling layer disposed between the first buffer element and the second buffer element,
wherein the coupling layer does not overlap with the vibrating acoustic element when viewed from the top, and
wherein the second buffer element is coupled with the first buffer element via the coupling layer.

16. The bottom member of claim 15, wherein the filling layer is in contact with the coupling layer and the second buffer element.

17. The bottom member of claim 14, further comprising:
a heat-dissipating element disposed under and coupled with the second buffer element,
wherein the second opening is further defined in the heat-dissipating element.

18. The bottom member of claim 14, wherein
the filling layer is further disposed between the first buffer element and the second buffer element, and
the second buffer element is coupled with the first buffer element via the filling layer.

19. The bottom member of claim 1, wherein
the vibrating acoustic element comprises a first electrode, a second electrode, and a vibrating material layer disposed between the first electrode and the second electrode, and
the vibrating material layer comprises at least one of a piezoelectric material, a piezoelectric film, and an electroactive polymer.

20. A display device comprising:
a display panel; and
a bottom member disposed under the display panel,
wherein the bottom member comprises:
a light-absorbing element disposed under the display panel;
a top coupling layer disposed between the light-absorbing element and the display panel to couple the light-absorbing element with the display panel;
a first buffer element disposed under the light-absorbing element, wherein a first opening is defined in the first buffer element;
a filling layer disposed in the first opening; and
a vibrating acoustic element disposed below the first buffer element,
wherein the vibrating acoustic element overlaps with the first opening and the light-absorbing element when viewed from a top, and
wherein the vibrating acoustic element is coupled with the first buffer element via the filling layer.

21. The display device of claim 20, wherein the display panel outputs a sound in response to a vibration of the vibrating acoustic element.

22. The display device of claim 20, wherein
the display device comprises a display area and a non-display area, and
at least a part of the vibrating acoustic element is disposed within the display area.

23. The display device of claim 20, further comprising:
a bracket disposed under the bottom member; and
a lower buffer element disposed between the bracket and the bottom member.

24. The display device of claim 23, wherein the lower buffer element overlaps with the vibrating acoustic element when viewed from the top.

25. The display device of claim 23, wherein
the bottom member further comprises a bottom coupling element disposed on the lower buffer element, and
the lower buffer element is attached to the bottom coupling element.

26. The display device of claim 20, wherein the bottom member further comprises:
a heat-dissipating element disposed under the first buffer element,
wherein a second opening is defined in the heat-dissipating element, and
wherein the vibrating acoustic element is disposed inside the second opening.

27. The display device of claim 26, wherein the bottom member further comprises:
a second buffer element disposed between the first buffer element and the heat-dissipating element,
wherein the second opening is further defined in the second buffer element.

28. A display device comprising:

a display panel;

a light-absorbing element disposed under and coupled with the display panel;

a buffer element disposed under and coupled with the light-absorbing element, wherein a first opening is defined in the buffer element;

a vibrating acoustic element disposed under and coupled with the buffer element; and a filling layer disposed in the first opening, wherein a periphery of the first opening is located more inside than a periphery of the vibrating acoustic element, and wherein the vibrating acoustic element is coupled to the buffer element via the filling layer.

29. The display device of claim 28, further comprising:

a heat-dissipating element disposed under the buffer element, wherein a second opening is defined in the heat-dissipating element, and wherein the periphery the vibrating acoustic element is disposed more inside than a periphery of the second opening.

* * * * *